(12) United States Patent
Dykyj

(10) Patent No.: US 6,752,541 B1
(45) Date of Patent: Jun. 22, 2004

(54) CAMERA JIB

(76) Inventor: John Dykyj, 24 Second Rd. W., Stoney Creek, Ontario (CA), L8J 2V3

( * ) Notice: Subject to any disclaimer, the term of this patent is extended or adjusted under 35 U.S.C. 154(b) by 0 days.

(21) Appl. No.: 10/376,726

(22) Filed: Feb. 28, 2003

(51) Int. Cl.[7] ............................................ G03B 17/02
(52) U.S. Cl. ................ 396/428; 248/123.11; 248/176.1
(58) Field of Search .................... 248/123.11, 123.2, 248/125.9, 176.1, 176.3; 396/419, 428

(56) References Cited

U.S. PATENT DOCUMENTS

| | | | |
|---|---|---|---|
| 4,163,538 A | 8/1979 | Galione | 248/278 |
| 4,655,567 A | 4/1987 | Morley | 352/243 |
| 4,657,220 A | 4/1987 | Lindsay | 248/647 |
| 4,702,450 A | 10/1987 | Barisa | 248/292.1 |
| 4,849,778 A | 7/1989 | Samuelson | 354/81 |
| 4,907,768 A | 3/1990 | Masseron et al. | 248/123.1 |
| 4,943,019 A | 7/1990 | Mester | 248/123.1 |
| 5,033,705 A | 7/1991 | Reagan | 248/123.1 |
| 5,054,725 A | 10/1991 | Bucefari et al. | 248/123.1 |
| 5,177,516 A | 1/1993 | Fitz et al. | 354/81 |
| 5,192,963 A | 3/1993 | Hill | 354/81 |
| 5,531,412 A | 7/1996 | Ho | 248/123.2 |
| 5,671,932 A | 9/1997 | Chapman | 280/47.11 |
| 5,697,757 A | 12/1997 | Lindsay | 414/744.6 |
| 5,856,862 A | 1/1999 | Kokush | 352/243 |
| 5,940,644 A | 8/1999 | Putora | 396/50 |
| 5,940,645 A | 8/1999 | Bonin | 396/421 |
| 6,191,842 B1 | 2/2001 | Navarro | 352/38 |
| 6,217,236 B1 | 4/2001 | Chapman | 396/428 |
| 6,345,919 B1 | 2/2002 | Chapman | 396/428 |
| 6,450,706 B1 | 9/2002 | Chapman | 396/428 |
| 6,478,427 B1 * | 11/2002 | Morris et al. | 352/243 |

OTHER PUBLICATIONS

The Digistore.com, Feb. 17, 2002, Website advertising ("Hague" Jibs).
EZ FX, Feb. 17, 2002, Website advertisement (verizoom.com).
Birns & Dawyer, Inc., Feb. 17, 2002, Website advertisement.
Tab Crabb & Ed COffey, Feb. 17, 2002, Website advertisement (Ent. Camera Support).
jimmyjib.com, Feb. 17, 2002, Website advertising (Jimmy Jib).
Glidecam Industries, Inc., Feb. 17, 2002, Website advertising (Glidecam Jibs).
Mathewsgrip.com, Feb. 17, 2002, Website advertising (Jungle Jib and Mini Jib).
NightShift Enterprises, Feb. 17, 2002, Website advertising (Skyerane Junior Jib).

* cited by examiner

Primary Examiner—David M. Gray
(74) Attorney, Agent, or Firm—Tim Headley; Gardere Wynne Sewell LLP

(57) ABSTRACT

A hand powered camera jib includes an arm which defines a longitudinal axis. At one end, the arm has a pivoting control platform, and at the other end, a pivoting camera platform. The jib also includes a leveling system to maintain the camera platform at an operator selected camera tilt angle. A modified leveling system may also maintain the control platform at the selected tilt angle. The jib includes one or more mounts to support the jib on a stand. A hand powered control is used to pan the camera platform. A second hand powered control allows an operator to change the tilt angle of the camera platform. The jib arm may be folded or collapsed to reduce its overall length.

32 Claims, 18 Drawing Sheets

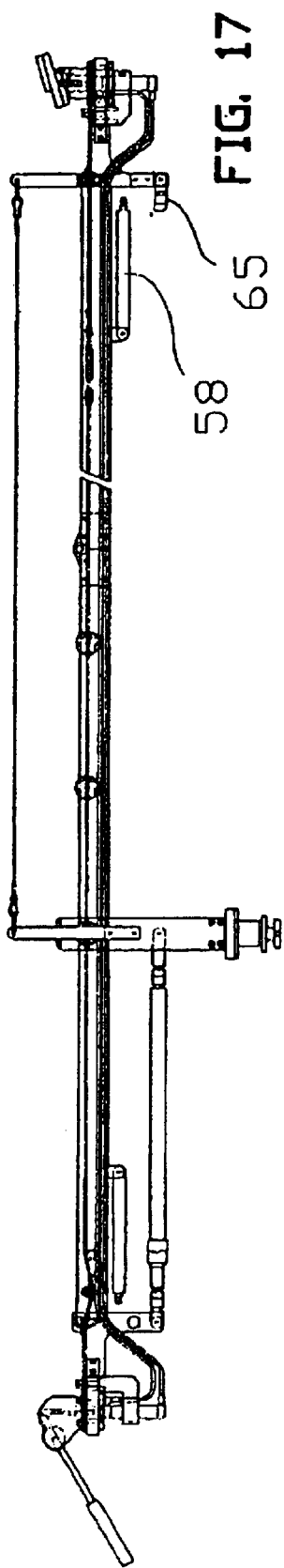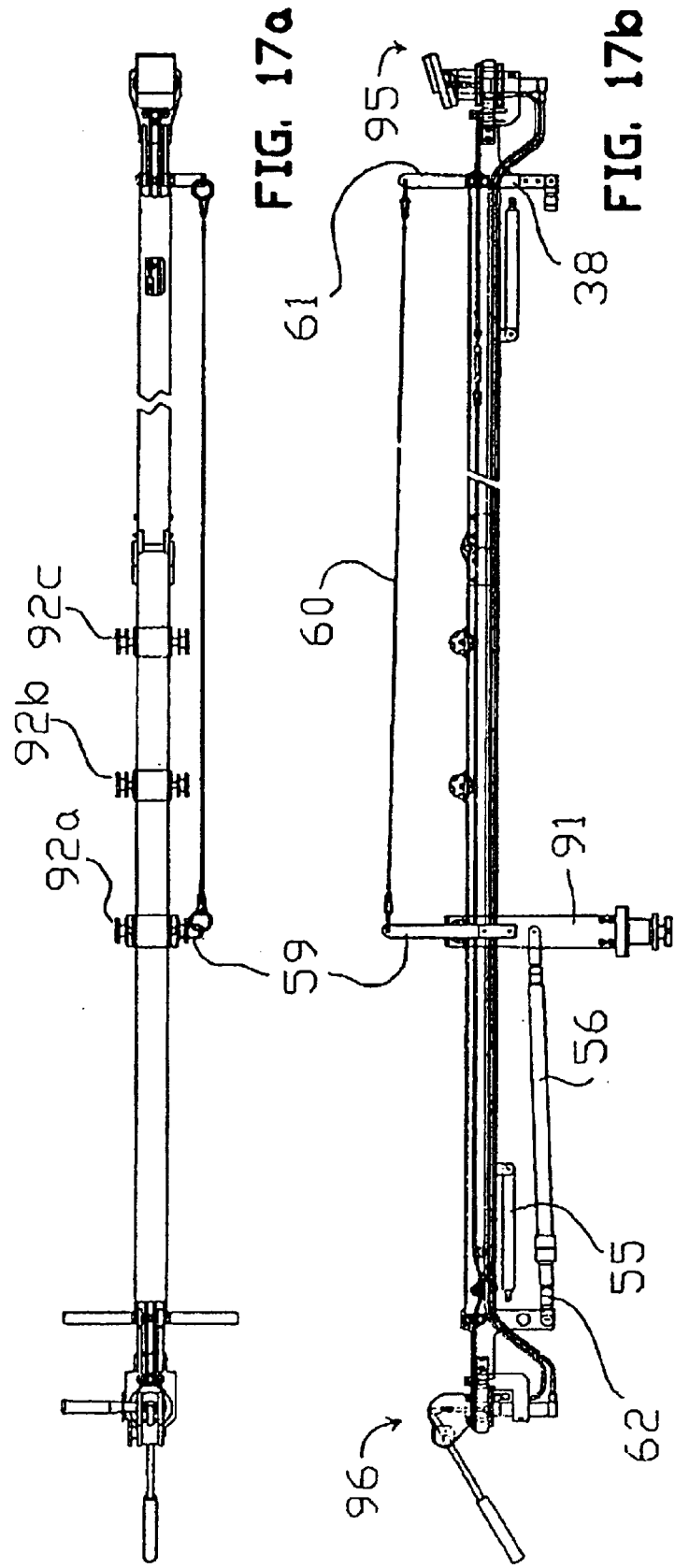

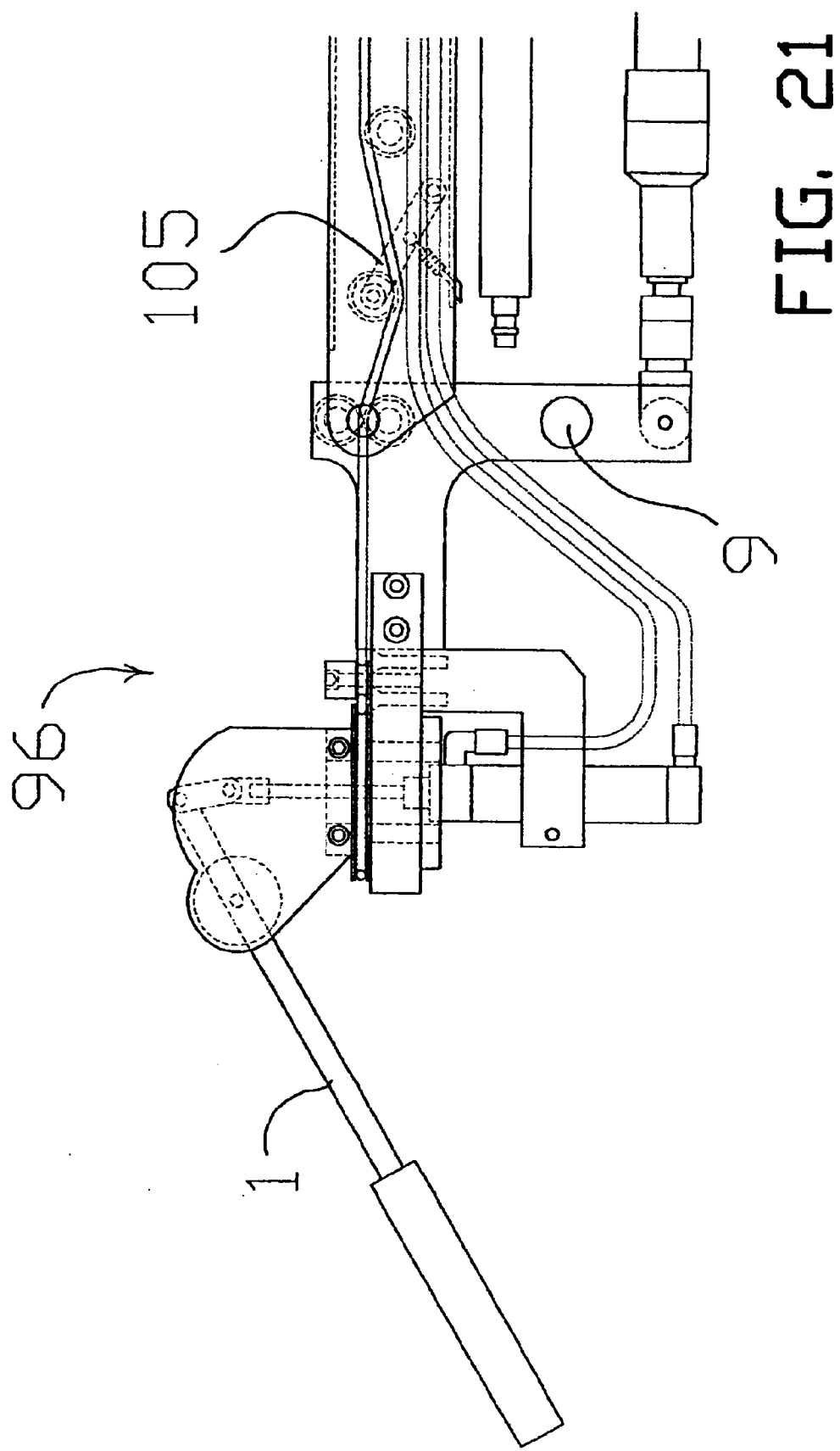

CAMERA JIB

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A "SEQUENTIAL LISTING," A TABLE, OR A COMPUTER PROGRAM LISTING APPENDIX SUBMITTED ON A COMPACT DISC

Not Applicable.

BACKGROUND OF THE INVENTION

1. Field of the Invention

The invention relates to camera support devices, and more particularly to camera jibs.

2. Description of the Related Art

Camera jibs are used by film and television crews to position and support their cameras in special positions, or at awkward or extended positions. Camera jibs also enable a camera to capture action close up without the intrusion of a camera operator, such as during a live performance.

A camera jib operates as a crane for a camera, balancing the camera on an end of an elongated arm. The arm may be balanced on any of a number of types of supports.

Various dollies and stands are known in the prior art. The jib arm allows the camera to be moved up or down in position or from side-to-side. The longer the arm at the camera end, the more range is provided for these motions. However, the arm must be load-balanced to prevent "tipping" of the arm, namely a downward tipping of the end supporting the camera.

Another concern is that the camera must remain level in the course of moving the arm. The leveling action should be smooth and occur automatically as the jib arm is moved.

Typically, control of the camera itself is provided through an auxiliary apparatus that is known as a "head". The head on modem jibs is typically powered by an electrical source connected to drive motors and are controlled electronically by, for example, remote servo controls. The head allows the camera itself to be tilted (vertically) and panned (horizontally) for different filming vantages. Such auxiliary heads are expensive and require user training to operate.

It would be useful to provide a balanced, self-leveling camera jib that allows hand powered control of the camera as an integrated part of the jib. It would also be preferable to provide all of these features in a hand powered, mechanically driven and controlled system, rather than in an electrically powered or motorized apparatus, to reduce manufacturing and operating costs, improve user-friendliness, and to reduce the overall weight of the assembled jib.

Jibs must be transported frequently, and it would also be useful to provide a portable camera jib that can be disassembled quickly for storage or transportation. There is a need, in particular, for a folding jib arm.

BRIEF SUMMARY OF THE INVENTION

The camera jib of the present invention is hand powered to avoid the expense, weight and inconvenience associated with electrically powered motors and control systems. Often, the camera jib will be acquired or provided separately from a suitable stand to support the jib for use in operation. Similarly, the camera jib will often be made available for use with a wide variety of cameras supplied by different manufacturers.

In one aspect, the camera jib of the present invention is allowed to boom and swivel a camera when the camera jib is placed on a suitable stand. The jib includes an elongated arm and in which the arm defines a longitudinal axis. The arm comprises a control end supporting a control platform. At the opposite end of the arm, a head end supports a pivotable camera base platform, which supports a pivotable camera pan/tilt platform. The jib also includes a leveling system for maintaining the camera base platform at an operator selected camera tilt angle throughout the range of the boom. That is, the leveling system levels the camera base platform (and the camera) by compensating for any changes that would otherwise occur to the camera tilt angle as a result of booming the camera jib. The leveling system includes a first leveling linkage offset from the elongated arm and pivotably connected to, and extending a predetermined distance between, first and second posts defining a predetermined angle. The posts extend away from the elongated arm. The first post defines a vertical axis. In some aspects, the leveling system may also include a second leveling linkage offset from the elongated arm. Where it is provided, the second leveling linkage is pivotably connected to, and extends a predetermined distance between, third and fourth posts defining an angle, in co-acting relationship with the first leveling system. The third and fourth posts extend away from the elongated arm, and the third post defines a vertical axis.

In this aspect, the camera jib also includes a support for mounting the arm on a stand; a hand powered first control system for panning the camera pan/tilt platform; and a hand powered second control system for tilting the camera pan/tilt platform. In some aspects, the support for mounting the arm on the stand may include a single pivot positioned along the arm. In other instances, the support for mounting the arm may include a plurality of pivot points positioned along the arm, to provide the operator with a choice when mounting the jib on a stand (such as for example, a collapsible tripod, dolly or other structure) or on an adaptor for a suitable stand. Other suitable supports may also be used.

In another aspect, the invention provides a camera jib with an elongated arm defining a longitudinal axis. The elongated arm moves between a maximum length and a minimum length, allowing the arm to be retracted or folded for storage or relocation, and allowing the arm to be extended or unfolded for use. The jib arm is provided with a control end supporting a control platform and a head end supporting a pivotable camera base platform, which supports a pivotable camera pan/tilt platform. In the jib, a leveling system is provided to maintain the camera base platform at an operator selected camera tilt angle. The operator selected tilt angle is maintained at the selected orientation relative to the horizontal plane. Typically, an operator will select to have the camera base platform maintained at a level orientation with respect to the horizontal plane. A support is provided to mount the arm on a stand. The support may be adapted for use with commercially available camera stands, which may be acquired separately apart from the camera jib. A hand powered first control system is provided for panning the camera pan/tilt platform. A hand powered second control system is provided for tilting the camera pan/tilt platform.

In yet another aspect, the camera jib is adapted for booming and swiveling a camera on a stand. The jib includes an elongated arm defining a longitudinal axis. The arm is foldable at a pivot point along the longitudinal axis. The jib arm includes a control end supporting a control platform; and a head end at the opposite end of the arm, supporting a pivotable camera base platform, which supports a camera pan/tilt platform. The jib arm co-acts with a leveling system for maintaining the camera base platform level relative to the horizontal plane. A support is provided for mounting the arm on the stand. A hand powered cable assembly is provided for panning the camera pan/tilt platform. The cable assembly may be mounted on a track defined by a plurality of bearing guides. A hand powered hydraulic assembly is used to tilt the camera pan/tilt platform. The hydraulic assembly may include a pair of hydraulic cylinders in fluid communication along a closed fluid circuit to allow the hydraulic cylinders to co-act, as the operator adjusts the tilt angle via manipulation of the appropriate control element.

The foregoing are examples of certain aspects of the present invention. Many other embodiments are also possible and will become apparent to those skilled in the art from a review of the detailed description of certain preferred embodiments of the present invention.

BRIEF DESCRIPTION OF THE SEVERAL VIEWS OF THE DRAWINGS

Certain embodiments of the invention will be described in relation to the drawings, in which:

FIG. 17 is a side view of a third embodiment of the camera jib.

FIG. 17A is a top view of the embodiment shown in FIG. 17.

FIG. 17B is a side view of a variant of the embodiment shown in FIGS. 17 and 17A.

FIG. 21 is a detailed partial side view of the control end of a sixth embodiment of the camera jib showing a cable tensioning assembly and an alternate placement for the counterweight support bars.

DETAILED DESCRIPTION OF THE INVENTION

Figure 1:
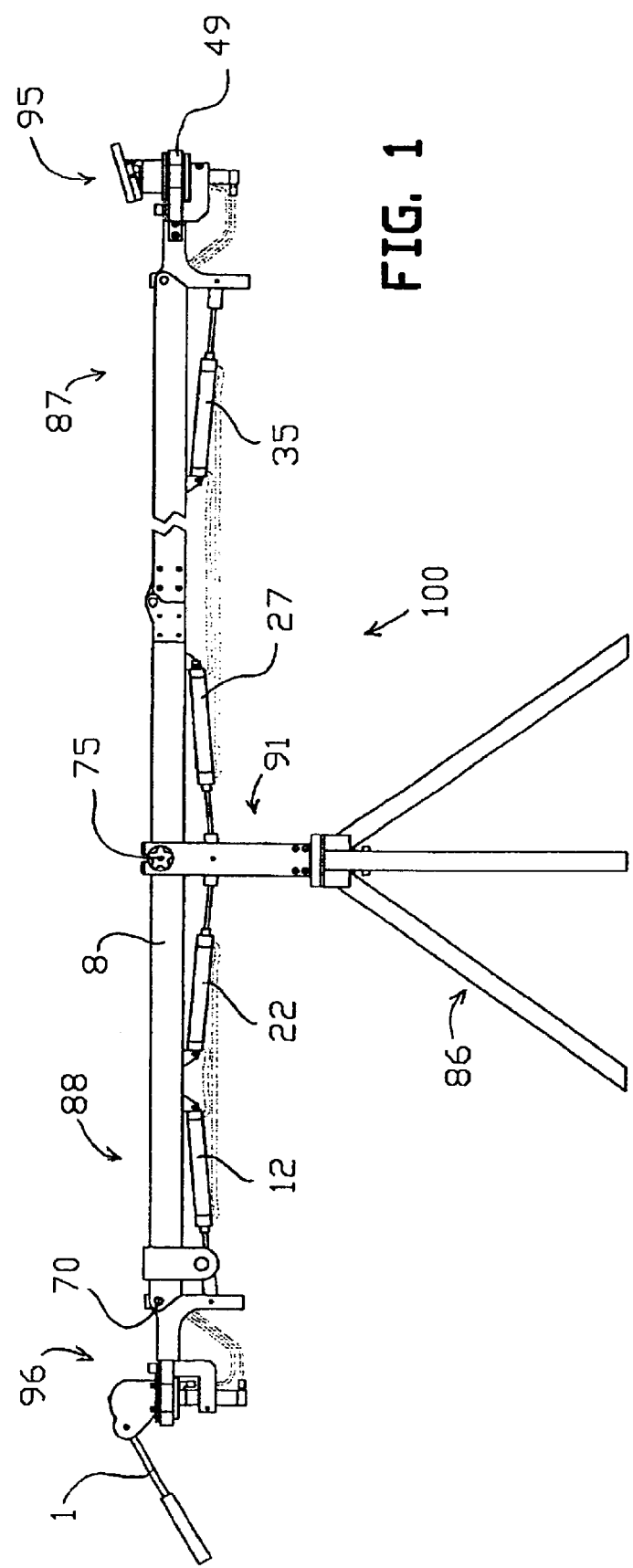
FIG. 1 is a side view of a first, preferred embodiment of the invention, namely a camera jib.

With reference to FIG. 1, the camera jib 100 has a T-shape design. The jib 100 includes an arm 8 balanced on the fulcrum point 75 of an upright member 91 for supporting a camera (not shown) mounted on a camera base platform 49 at a head end 87 of the arm 8. The jib 100 allows an operator (not shown) to move the camera by booming the arm 8 from the operator's position at a distance away from the camera. The jib arm 8 also includes integrated camera controls allowing the operator to pan and tilt the camera itself from the remote operating position. The arm includes a levelling system so that the camera base platform and camera controls are kept at the selected level relative to the horizontal plane as the jib arm 8 is boomed.

The operation of the camera jib 100 preferably employs hand powered, mechanical control elements rather than electronic controls and electrically powered motors. The invention provides that both the camera controls and the levelling are hand powered. This feature may be used to provide one or more of a number of practical advantages for operators:

the jib arm may be foldable, to allow an extended span, which may be reduced for transport and storage;

the jib arm may be manufactured to be lightweight and easily portable (dismantle-able);

the jib arm may be designed to include a single apparatus allowing booming and camera control without the need for an additional, auxiliary control head;

many embodiments will be possible, featuring inexpensive, easily replaceable parts;

the jib arm can be used in remote or unserviced locations (as it requires no power input or heavy battery);

the jib arm is simple to operate even for unskilled technicians.

For manufacturers, the invention also allows flexibility in that the jib can be customized in different lengths and be manufactured of various materials to suit the application.

Figure 13:
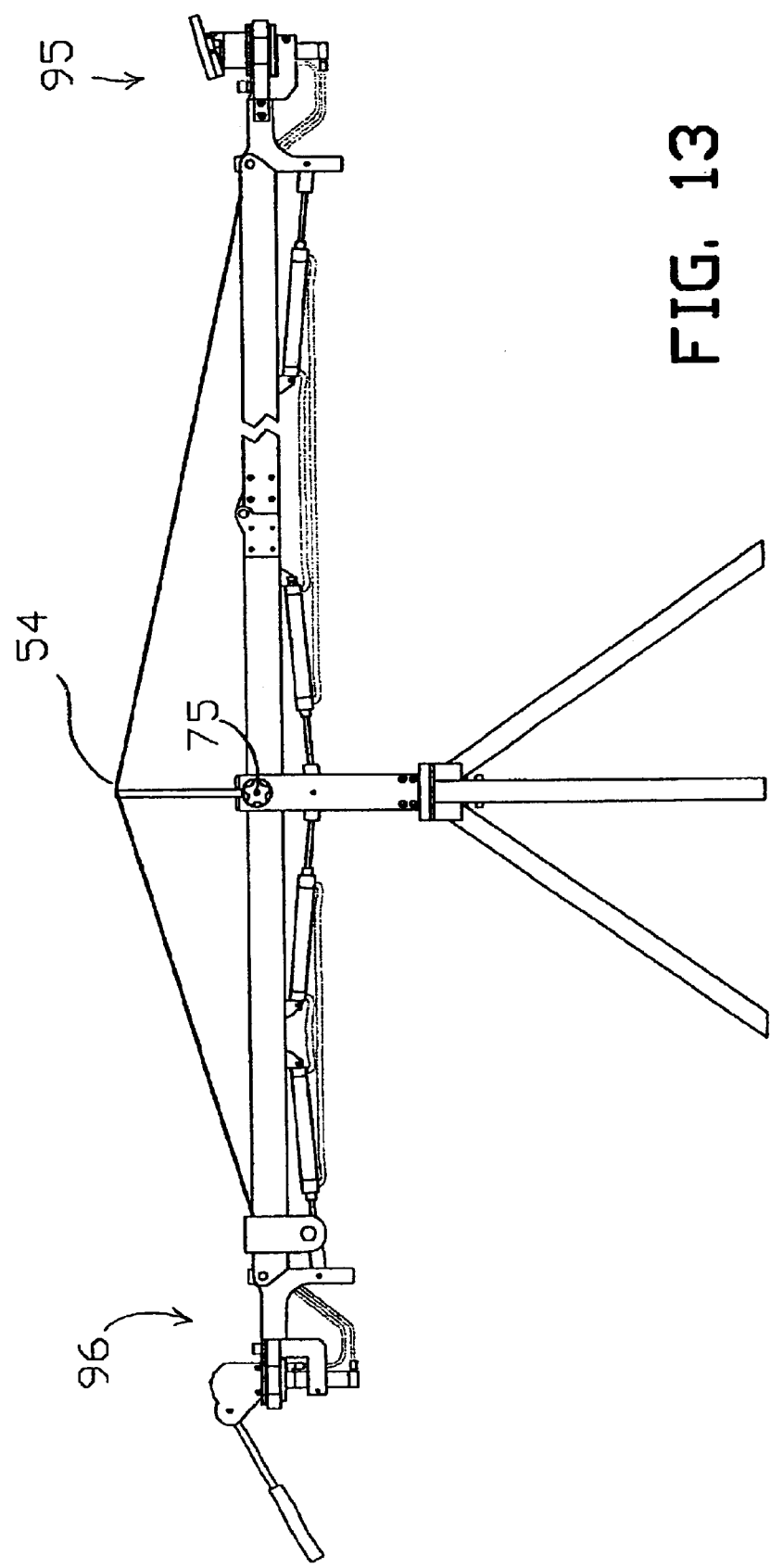
FIG. 13 is a side view of the camera jib of the first embodiment showing a cable weight distribution system.
Figure 14:
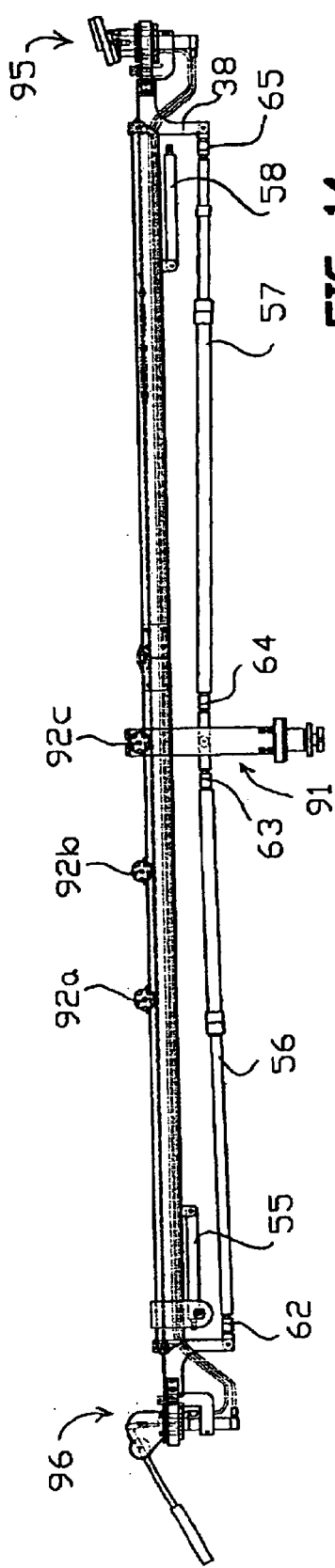
FIGS. 14–16 are side views of the camera jib showing a second embodiment of the present invention in various configurations along the longitudinal axis of the camera jib arm.
Figure 15:
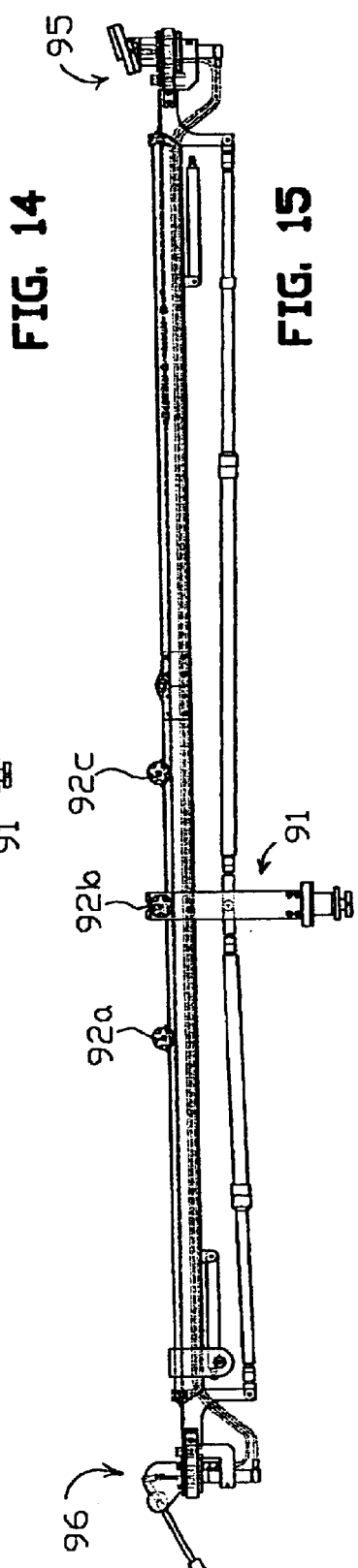
Figure 16:
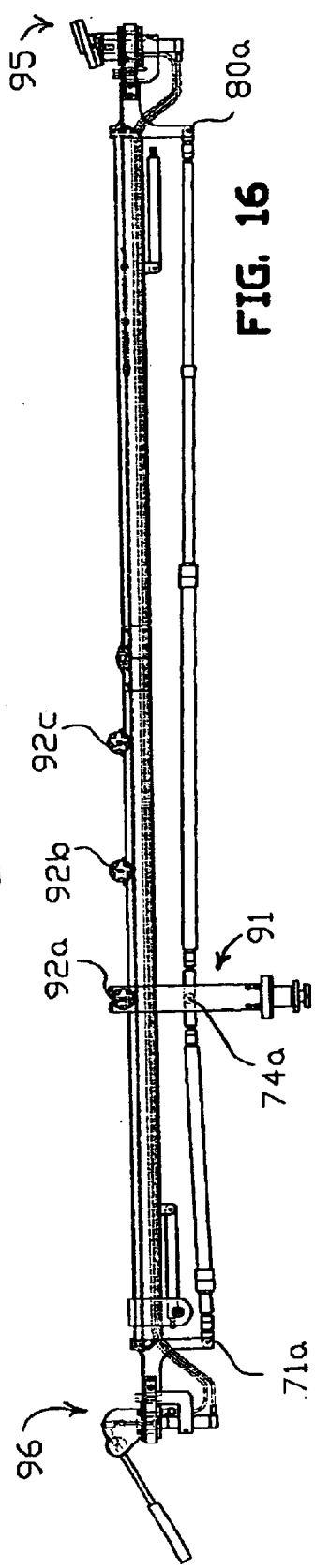
Figure 18:
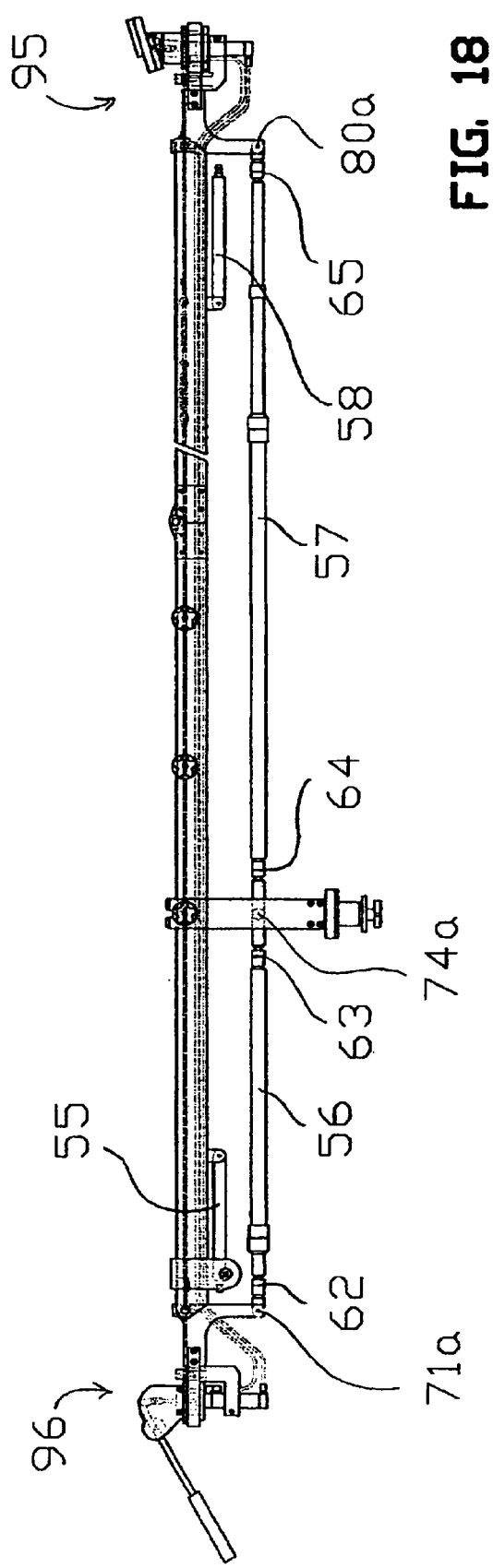
FIG. 18 is a side view of a fourth embodiment of the camera jib.
Figure 20:
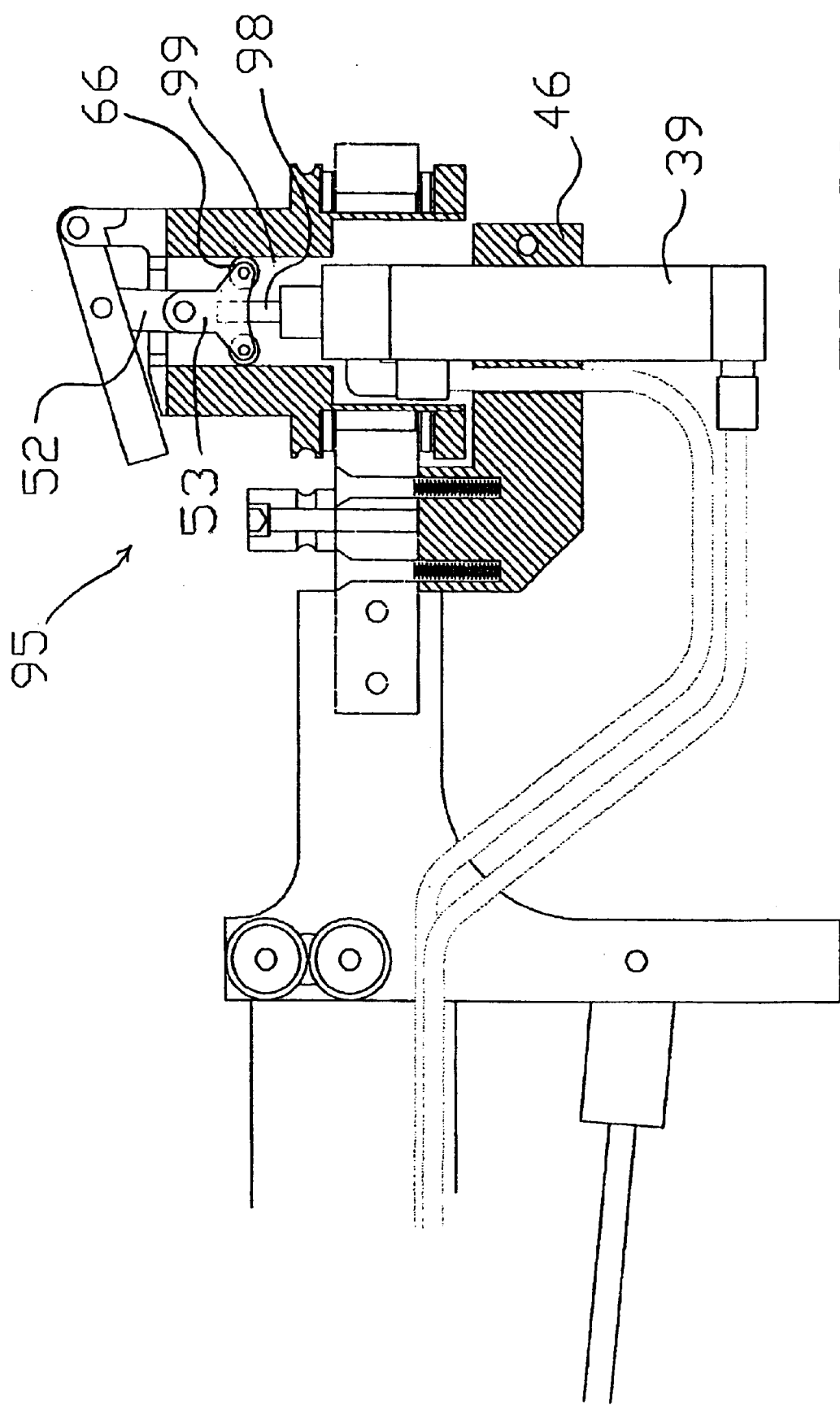
FIG. 20 is a detailed sectional, partial view of the head end of a fifth embodiment of the camera jib.

The figures refer to six embodiments of the present invention. The first embodiment includes a single fulcrum pivot point 75 and is shown in FIGS. 1–13. The second embodiment includes a variable fulcrum 92a–92c as shown in FIGS. 14–16. A third embodiment features a levelling system including a cable assembly in which a cable 60 is held in a track, under tension, as shown in FIG. 17. A fourth embodiment with adjustable, parallel, levelling arms 56, 57 is shown in FIG. 18. A fifth embodiment having a modified hydraulic cylinder plunger guide 66 is shown in FIG. 20. A sixth embodiment including a pan cable tension mechanism 105 is shown in FIG. 21.

Figure 3:
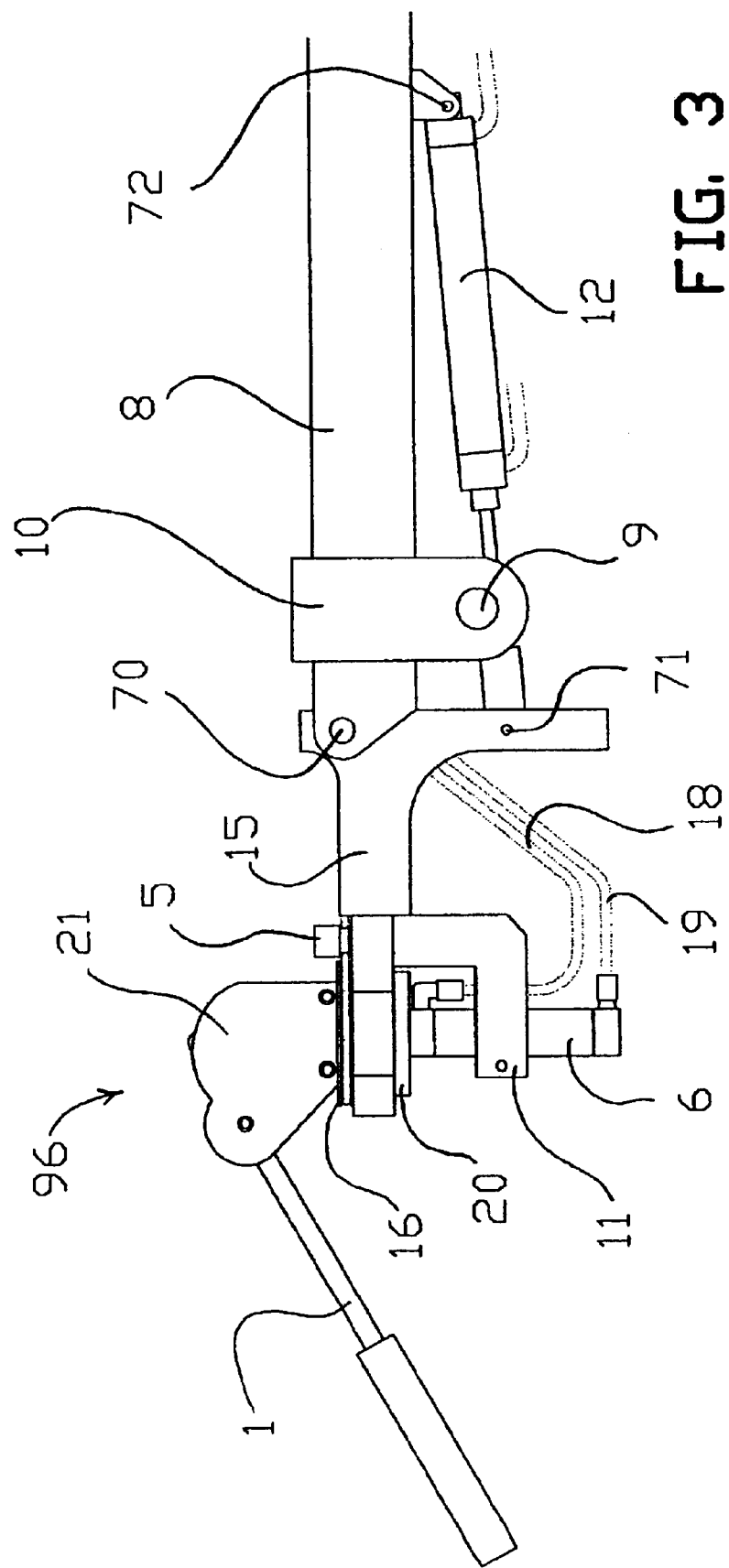
FIG. 3 is a detailed side view of a control end of the camera jib.
Figure 4:
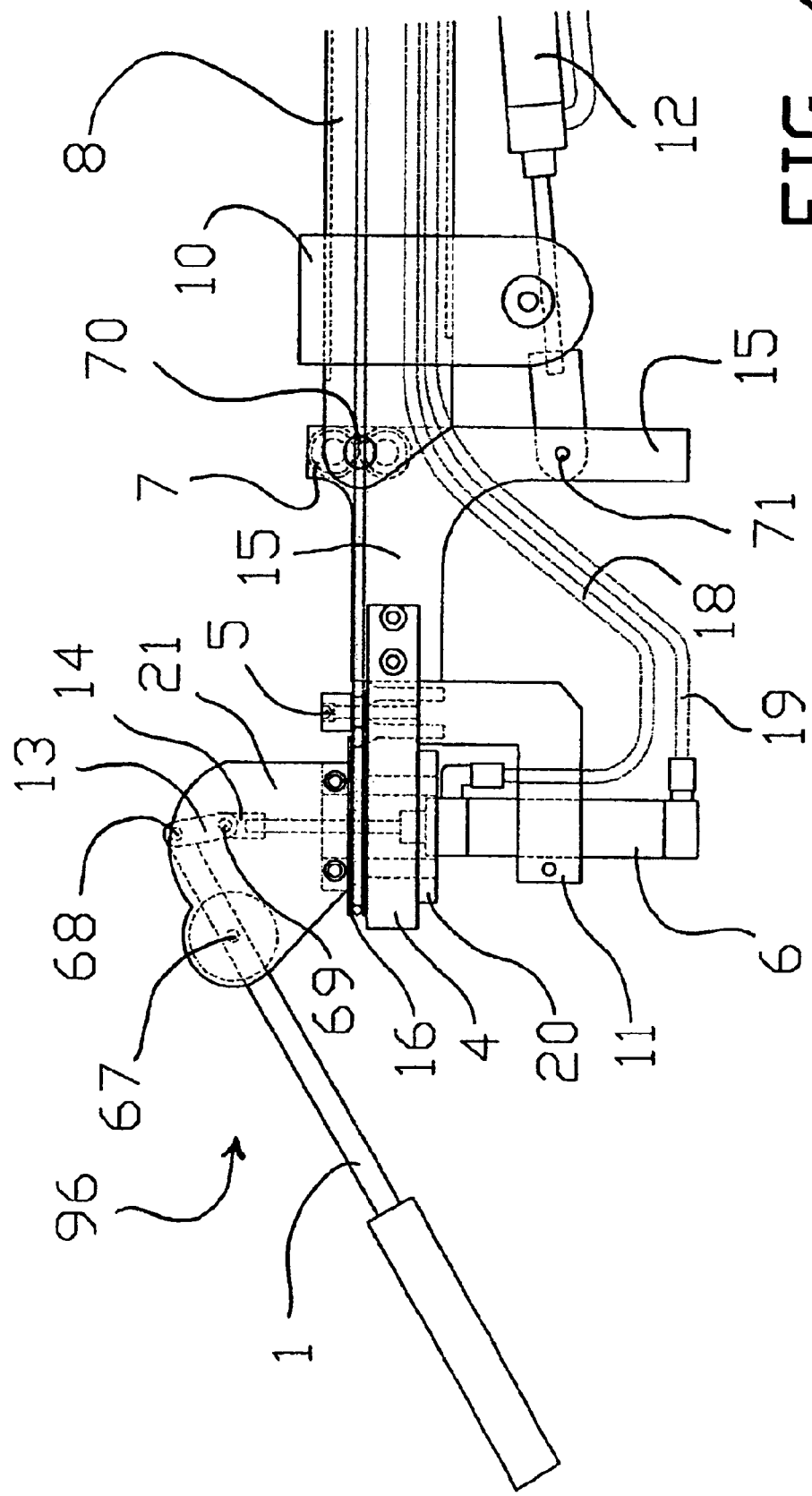
FIG. 4 is a detailed side view of the control end of the camera jib showing internal features of the first embodiment.

With reference to FIGS. 1, 4, the camera jib 100 has a longitudinal arm 8 which is coupled to a vertical stand 86 via an upright member having a pivot point 75 between the two ends of the arm. Thus, the arm and stand/upright member form an overall T-shape. The arm 8 has two opposite ends, a head end 87 and a control end 88. The head end 87 (shown in detail at FIGS. 11–12) supports a video camera (not shown). The control end 88 (shown in detail at FIGS. 3–5) provides the operator controls for booming the arm 8, and panning and tilting the camera. The head end 87 includes a camera base platform 49 mounted in pivotal, operational relation to the arm 8. The control end 88 includes a control platform assembly 96, which features a control platform 4, a control lever 1 being mounted in pivoting, operational relation to the horizontal plane. These platforms 4, 49 are operationally linked to allow the controls and camera base platform to be kept level, even when either end 87, 88 of the arm 8 is moved up or down. Preferably, the fulcrum 75 of the jib is located closer to the control end 88 than to the head end 87 of the arm (as shown in FIG. 1), thereby allowing a greater range of booming. However, the fulcrum may be positioned at a variety of locations between the two ends of the jib arm without departing from the spirit of the invention.

In the first embodiment as shown in FIGS. 1 to 13, the arm 8 is mounted above the stand 86 at the single fulcrum point 75 of an upright member 91. However, in a second embodiment, a selection of multiple possible fulcrum points 92a–92c is provided on the jib arm 8 (as shown in FIGS. 14–16). The position of the fulcrum at any of the points 92a–92c affects the range of booming of the arm 8. The closer the fulcrum is positioned to the control end 88, the greater the range of booming (i.e. the head end can be tilted higher, or swivelled to a greater extent in either sideward direction).

The position of the fulcrum 75 also affects the weight balancing of the arm 8. In general, the arm 8 must carry a relatively heavy camera (not shown) at one end (here, called the head end 87) and a relatively light set of controls (generally, 96) at the other end (here, the control end 88). This imbalance from a heavy camera loading will tend to cause a downward torque at the head end 87 of the arm. The head end 87 will tend to pivot downward. Persons skilled in the art will appreciate that the moments on each side of the arm must be equal to provide a substantially load-balanced jib arm 8. The greater the distance between the camera load and the fulcrum, the more weight is needed on the control end 88 of the arm 8 to counteract the downward torque generated at the head end. Therefore, it is desirable to have two or more selectable fulcrum positions provided closer to the camera load to permit easier load balancing. As the fulcrum position approaches the head end (camera load end) less counterweight is needed near the control end to equalize the moments. The second embodiment (shown in FIGS. 14–16) provides variable fulcra to allow the operator to select a fulcrum position within a range of positions, 92a–92c.

Figure 5:
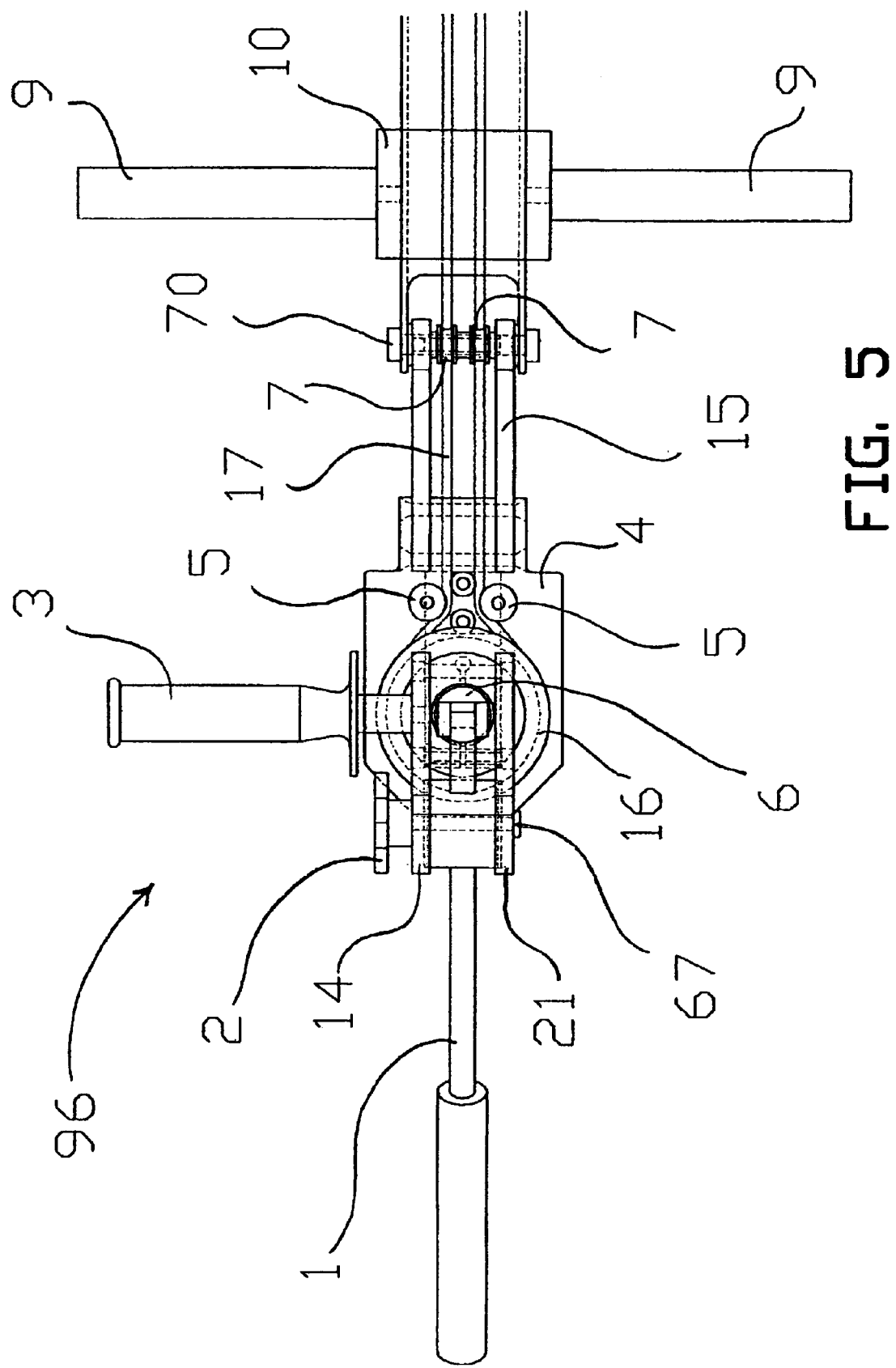
FIG. 5 is a detailed top view of the control end of the camera jib showing internal features of the first embodiment.

To overcome downward torque at the head end (weighted with a heavy camera), counterweights (not shown) may be mounted on support bars 9 proximate to the control end 88 to counter-balance the weight loading at the head end. Preferably, as shown in FIGS. 3, 5, 21, the arm 8 will include counterweight support bars 9 on a counterweight bar support 10 to support suitable weights to counterbalance the camera load at the head end 87. As shown in FIG. 21, the counterweight bars 9 may be provided on the control platform L brackets 15. This placement is advantageous as it maintains a constant distance between the weight and the fulcrum. As shown in the embodiment of FIG. 13, the jib 100 may include one or more cables 54 strung taut above the arm 8 to better distribute and support the loadings of the camera and counterweight positioned at opposing ends 87, 88 of the jib 100.

Figure 11:
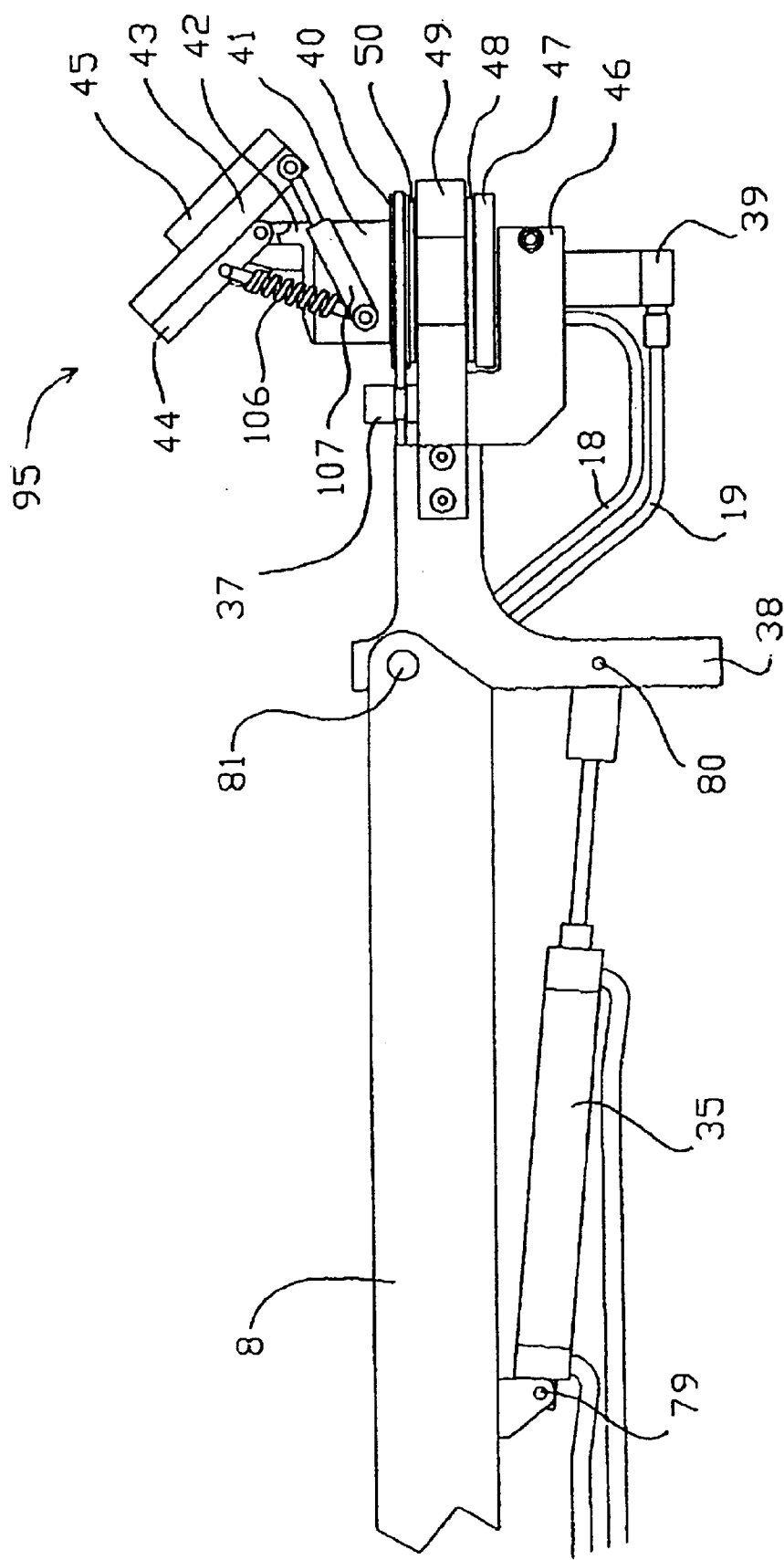
FIG. 11 is a detailed side view of the head end of the first embodiment of the camera jib.

Due to its elongated length, the jib arm 8 may tend to sag (or "bow") from the weight of the ends 87, 88 creating stress on the body of the arm 8. To counteract this tendency, the arm may be provided with a cantilever-type post and cable assembly 54 to provide added support for the ends 87, 88 of the arm 8, as shown in FIG. 13. Of course, other features may be incorporated to reinforce the jib arm or otherwise prevent sagging or distortion of the jib arm when the jib arm is loaded. For instance, a camera weight support mechanism may be provided within the camera platform assembly 95 to support the weight of the camera, as shown in FIG. 11. The camera weight support mechanism may be provided by a tension spring 106, a compressed gas cylinder 107 or a combination thereof. The spring 106, cylinder 107, or a co-acting combination of both, acts upon the camera pan/tilt platform 44 to assist in restoring the platform 44 to a neutral position. The mechanism reduces the effort required by the operator to tilt the camera back up from a downward tilted position. This is especially advantageous when a relatively heavy camera is used.

The jib arm 8 is preferably made of hollow lightweight material, preferably a square aluminium tube. Portability is one of the advantages of a lightweight arm design. An optional carrying case may be provided (not shown). The entire arm 8 is preferably sufficiently lightweight to be portable by an operator. Preferably, the arm 8, when folded or collapsed, is dimensioned to fit in a typical passenger car.

Figure 2:
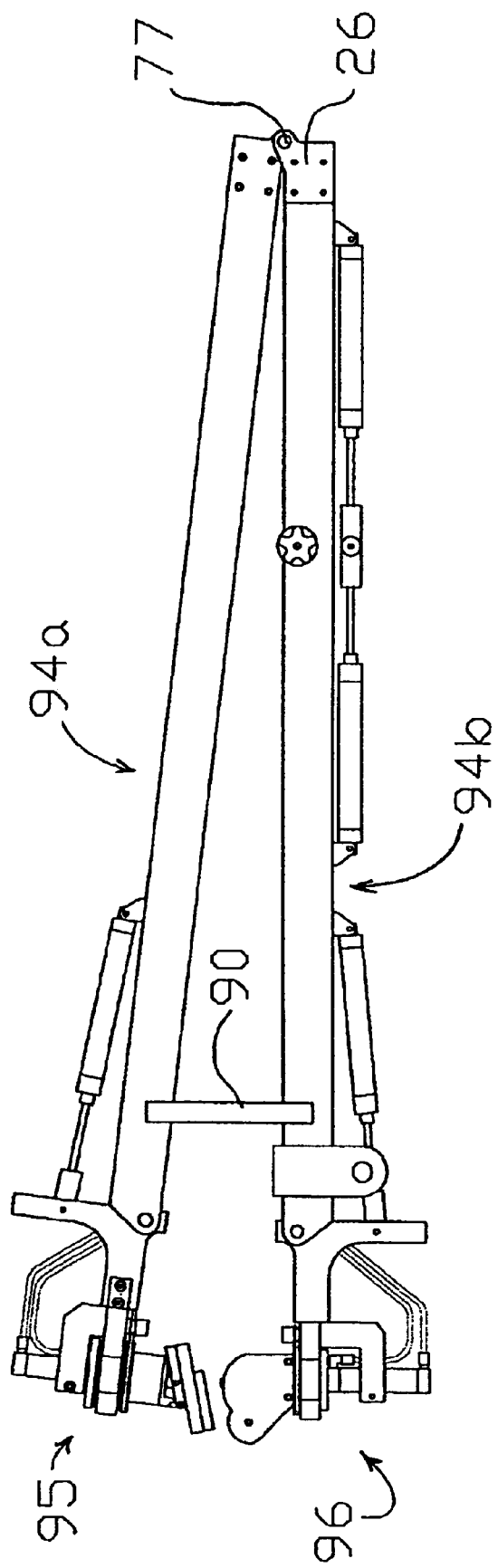
FIG. 2 is a side view of the jib of FIG. 1 in a folded state.
Figure 7:
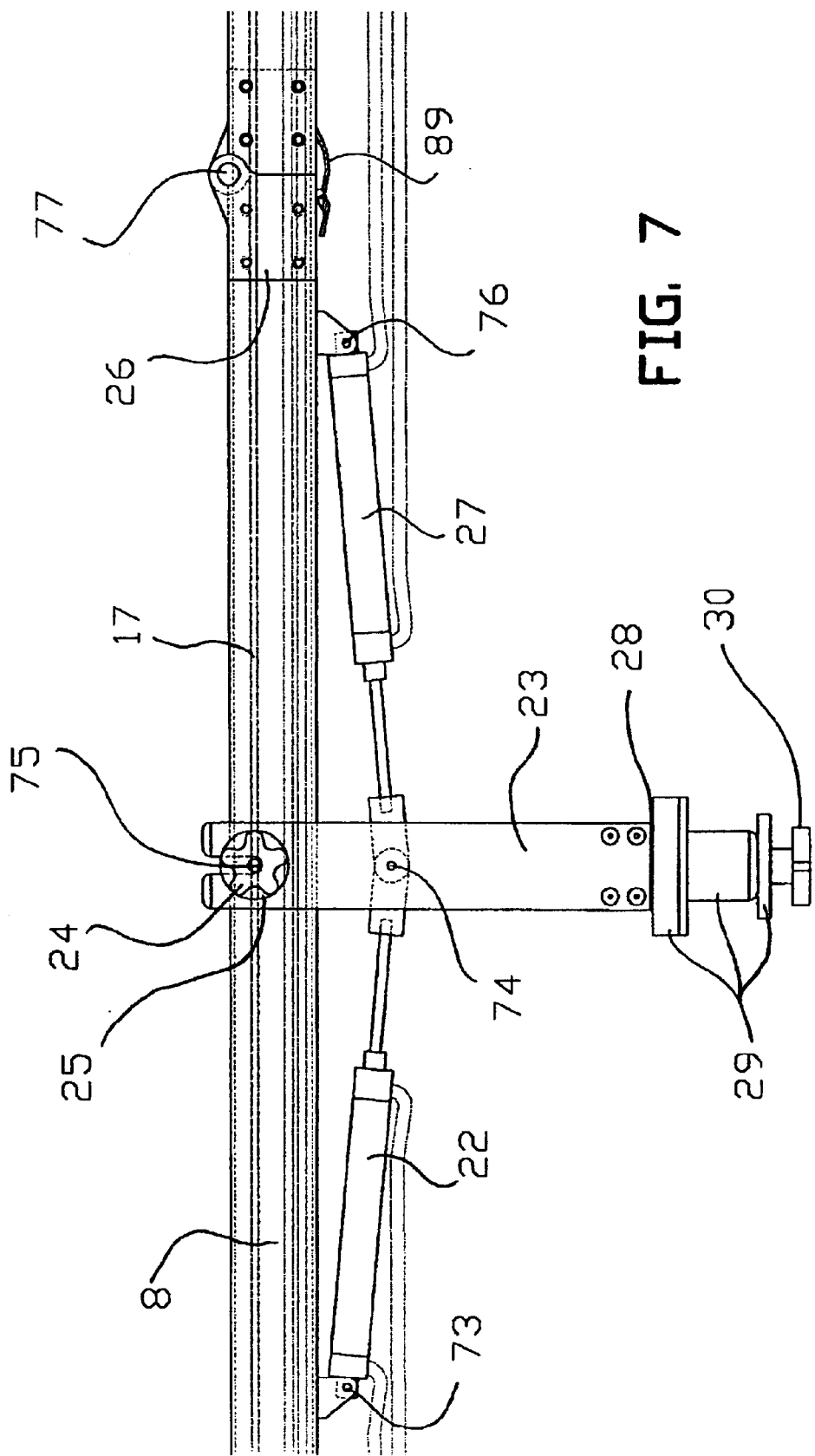
FIG. 7 is a detailed side view of the central region of the camera jib showing internal features of the first embodiment.
Figure 19:
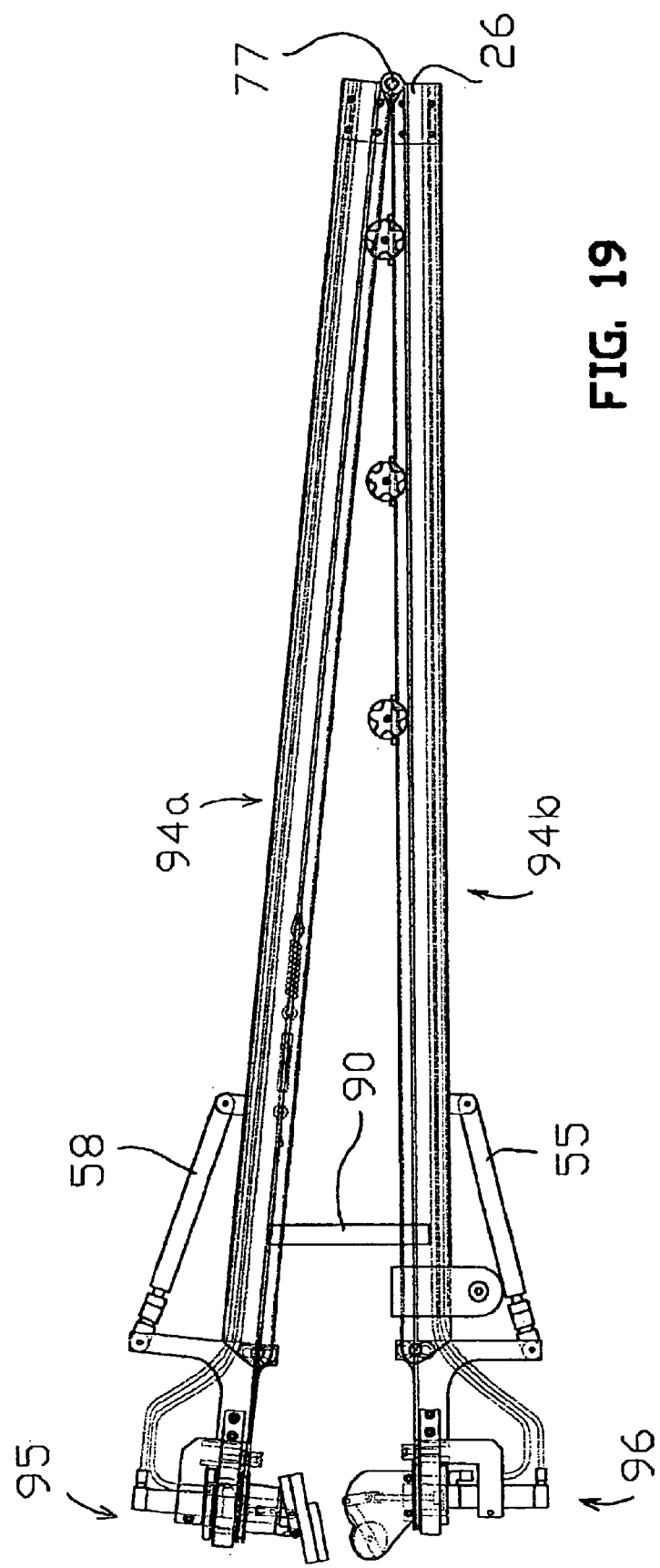
FIG. 19 is a side view of the fourth embodiment, shown in FIG. 18, in a folded state.

Allowing an operator to quickly reduce the overall length of the arm 8 by using an optional folding feature enhances the portability of the jib design. As shown in FIGS. 2, 19, the arm 8 preferably includes a fold hinge 26 near the midpoint of the arm 8 allowing the arm 8 to be folded for easy storage and transportation when the arm is removed from the stand 86. As shown in FIG. 7, a latch 89 is preferably provided opposite the hinge pivot 77 to stabilize the arm 8 and prevent accidental folding (or other movement about the fold hinge 26) when the jib 100 is in use or moved over short distances. To fold the arm 8, the latch 89 is unlocked and the head end 87 of the arm is brought toward the control end 88, by rotational movement at the hinge pivot 77, allowing the two opposite ends 87, 88 of the arm 8 to converge. The two segments 94a, 94b of the arm 8 are brought together to occupy a shorter space. Preferably, a further latch mechanism 90 is provided so that the folded halves 94a, 94b of the arm may be locked together to prevent unwanted unfolding while in storage or transit.

In an optional embodiment (which is not shown in the Figures), the jib arm may include a telescoping feature by providing multiple tube pieces in concentric, slidable relation, which can be extended out and locked in position, to provide a longer jib arm. In this option, a quick release feature (not shown) may be used in association with each telescoping joint, to allow adjacent pairs of telescoping segments to be repositioned and then secured for operation of the jib. In this option, the arm 8 does not necessarily fold, but may be collapsed (or extended) by unlocking the extension pieces and retracting (or extending) the arm 8 to its shortest length (or its maximum length, as the case may be). The operational length of the camera jib may be varied and selected from a range of lengths between a minimum jib arm length (when all telescoping segments are fully retracted) and a maximum jib arm length (when all telescoping segments are fully extended).

Figure 6:
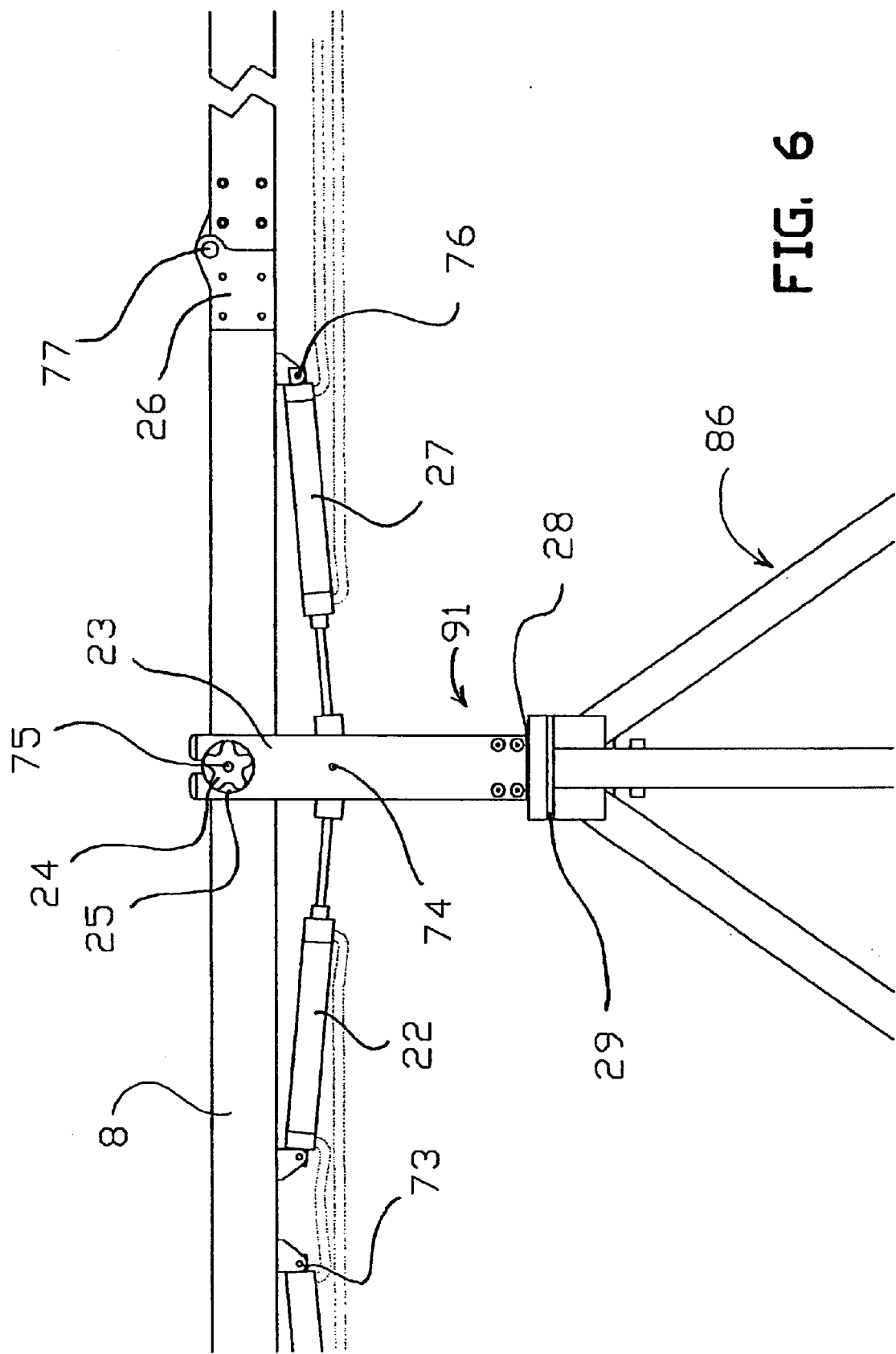
FIG. 6 is a detailed side view of the central region of the camera jib according to the first embodiment.
Figure 9:
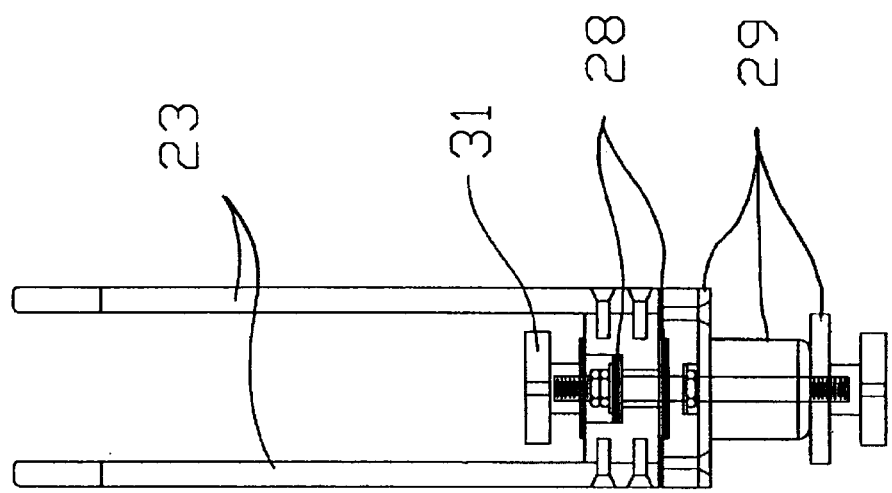
FIG. 9 is a detailed cross-sectional view along line A—A of FIG. 8.
Figure 8:
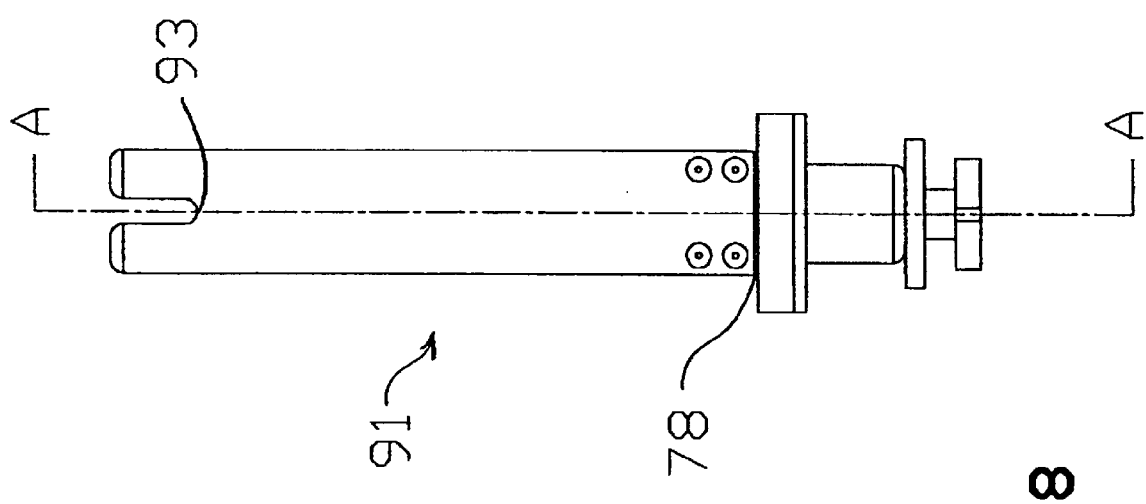
FIG. 8 is a detailed side view of the fulcrum and swivel assemblies of the first embodiment of the camera jib.

The fulcrum 75 and upright support member 91 of the first embodiment are shown in detail at FIGS. 6–9. FIGS. 6, 7 show the central region of the jib 100. FIG. 7 shows further details of internal features. FIGS. 8, 9 show the upright member 91 in detail. FIG. 9 is a cross-sectional view along line A—A of Fig .8. At the fulcrum point 75, the upright member 91 includes a pair of opposing support forks 23, which are provided with vertical slots 93, rounded at their lower ends, to pivotally support the weight of the arm 8. The rounded slots 93 allow pivoting of the arm ("booming") about a fulcrum pin extending between opposing forks 23, and defining fulcrum point 75. The arm 8 may be removed from the slots for dismantling the jib 100. The support forks 23 (as a unit) rotate above a swivel support mechanism 78. Swivel support mechanisms 78 preferably include a pair of thrust bearings 28 centered within a metal bushing or other bushing made of suitable material. The swivel mechanism 78 allows the entire arm 8 and support forks 23 to swivel about a vertical axis defined generally by the upright member 91. Engaging a boom swivel lock mechanism 31, which applies frictional force to the swivel mechanism 78, may inhibit the swivel mechanism 78. In the illustrated embodiment, the swivel mechanism 78 is coupled to a tripod adapter 29, which allows the fulcrum of the jib to be connected to a standard tripod and/or dolly (identified as stand 86). Preferably, the tripod adapter 29 (or other adaptor) is an interchangeable adaptor for connecting any one of various types of standard tripod, dolly fittings, or other stands to the arm. A tripod lock knob 30 is preferably provided to secure the connection between the adaptor and the stand.

When the arm 8 is pivotably secured within the rounded slots 93, an operator using a pan/boom control handle 3 controls booming. Booming of the arm 8 may be restricted by the operator by engaging a boom lock mechanism provided on the upright member 91. Preferably, the boom lock mechanism is provided by one or two locking knobs 24 acting on a pair of opposing friction disks 25. The locking knobs are shown mounted on the fulcrum pivot pin, to apply frictional resistance to the fulcrum uprights 23, thus friction-locking the arm 8 to inhibit pivoting movement about the fulcrum 75. The boom lock mechanism may also be used to immobilize the arm 8 (inhibit pivoting about the fulcrum pin), so that the arm 8, upright member 91, and stand 86 may be lifted together in assembled form, such as for transporting the assembled jib 100 over short distances.

Figure 12:
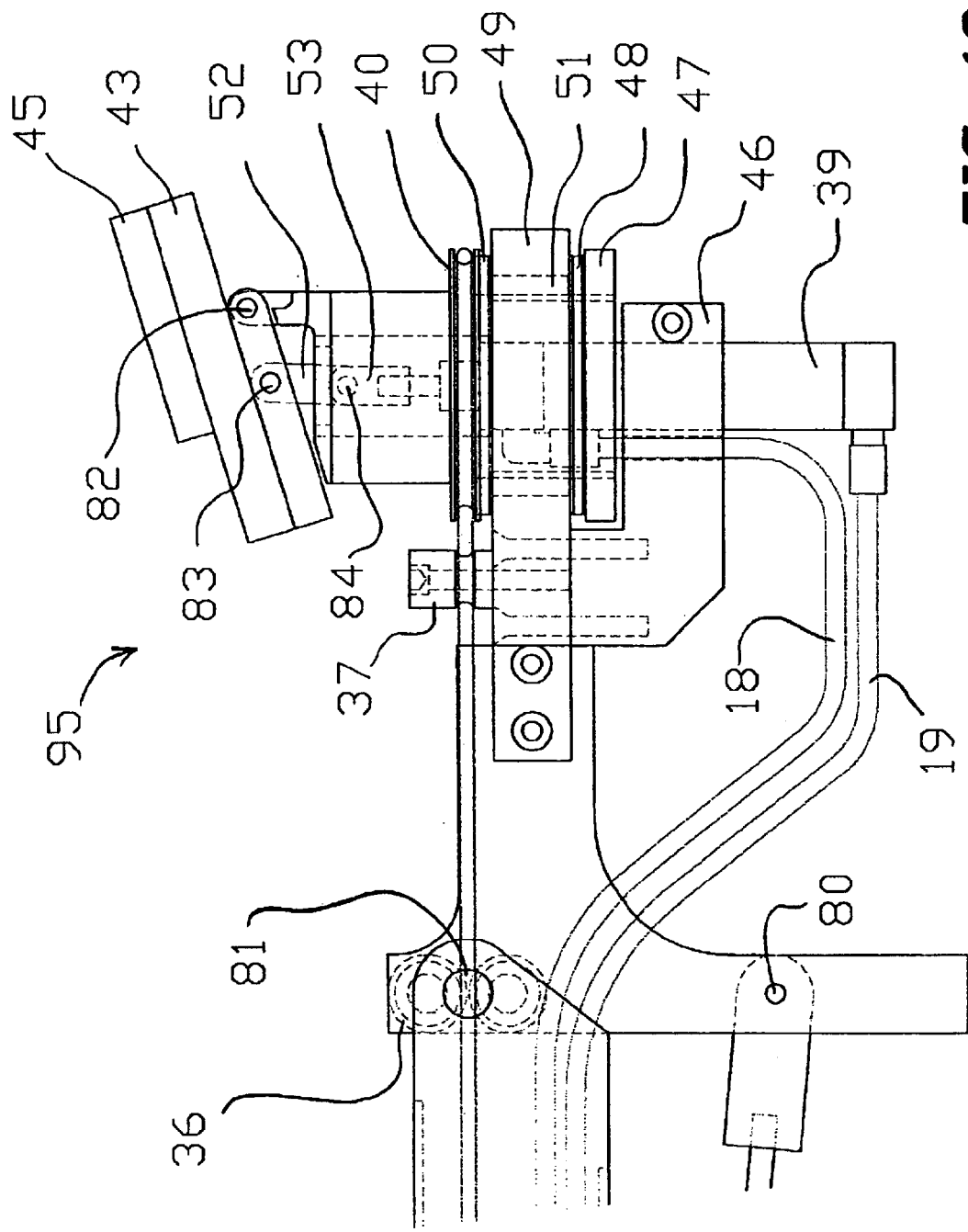
FIG. 12 is a detailed side view of the head end of the camera jib showing internal features of the first embodiment.

As shown in FIGS. 11, 12, a camera platform assembly 95 is provided at the head end 87 of the arm 8 to support a camera (not shown) and allow movement of the camera via control connections with the control lever 1 (shown in FIGS. 3–5) and the hydraulic levelling cylinder system. The camera platform assembly 95 preferably includes a conventional quick release mount 45 to couple the camera (not shown) to the jib 100, such as a Manfrotto™ quick release camera mount. For heavier cameras, a bolt connection (not shown) may also be used. The quick release mount 45 is in turn mounted on a camera pan/tilt platform 44 and adaptor 43 atop a tilt bracket 42 and camera riser 41. The camera pan/tilt platform 44 and adaptor 43, bracket 42 and riser 41 together provide a mechanical tilt control to allow the camera to be tilted relative to the horizontal plane. The control lever 1 is specifically linked to the camera pan/tilt platform 44. In this embodiment, the bracket 42 has a pivot point 82 about which the platform 44 can pivot, thereby allowing the operator to tilt the camera up or down remotely by using the control lever 1. The riser 41 is a spacer that provides the camera with additional clearance to tilt up without contacting the jib arm 8. In addition to the mechanical tilt control, the camera platform assembly 95 also includes a base platform 49 for holding the camera panning and tilting assemblies. The base platform 49 meets the jib arm at a pair of L brackets 38, and pivots at a camera base platform pivot 81 to maintain the entire camera platform assembly in a level orientation relative to the horizontal plane, by an operative link with an interconnected levelling system.

As shown in FIGS. 3–5, a control platform 4 is provided at the control end 88 of the arm to support the control assembly 96 for the camera pan/tilt operations and boom operation of the jib arm 8. The platform 4, which is coupled to the jib arm 8 by a pair of control platform L brackets 15, is kept in a level orientation relative to the horizontal plane by the operative link with the interconnected levelling system. In the embodiment of FIGS. 1–13, the levelling system includes the hydraulically connected levelling cylinders 12, 22, 27 and 35 and interconnecting hydraulic lines. The control platform 4 can also be used to mount an auxiliary monitor (not shown) to view camera functions and resulting picture/film production. Auxiliary electronic controls may also be added at the control end (not shown), powered by the camera (not shown), in addition to the auxiliary monitor (not shown) which is powered by a battery (not shown). The controls may also include further distinct control elements (for example, levers, dials, keys, buttons, or other suitable features) to remotely control the camera on/off and focus.

Tilting of the camera on the camera pan/tilt platform 44 is preferably controlled hydraulically through a pair of linked hydraulic cylinders, one hydraulic tilt cylinder 6 at the control end of the arm 8 (shown, for example, at FIG. 4) and one other hydraulic tilt cylinder 39 positioned below the camera platform assembly 95 at the head end of the arm 87 (located within a tilt cylinder bracket 46) (shown, for example, at FIG. 12). The hydraulic tilt cylinders 6, 39 are joined in fluid communication by flexible, hydraulic tubing (preferably two lines 18, 19) to form a closed fluid loop. The flexible, hydraulic tubing 18, 19 preferably runs through a protective housing defined by the hollow arm 8. As the camera tilt hydraulic cylinder 39 is operatively displaced in response to the corresponding operative movement of the control cylinder 6, the camera pan/tilt platform 44 tilts down (or up, as the case may be according to the selected operating step). The camera pan/tilt platform 44 arcs upward and downward, by pivoting movement, as the tilt cylinder moves linearly along its longitudinal axis. Hydraulic tilt cylinders 6, 39 are shown oriented such that their longitudinal axes are generally vertical. Hydraulic tilt cylinders 6, 39 are operationally activated, generally, by operational movement along their respective longitudinal axes. With reference to FIG. 12, a longitudinal displacement of the plunger assembly within tilt cylinder 39 will result in corresponding movement of pivoting drive link 52, generally along the corresponding longitudinal axis. Drive link 52 pivots about pivot points 83, 84, to inhibit lateral torque on the plunger arm of the hydraulic tilt cylinder during vertical displacement. Hence, a longitudinal displacement of the plunger assembly of tilt cylinder 39 will cause the camera pan/tilt platform to pivot about pivot point 82. In a further embodiment, a modified linkage may be provided, as shown in FIG. 20. The plunger shaft of tilt cylinder 39 may include a modified linkage 53 with a roller mechanism 66 which guides the cylinder shaft 98 along its path within a guide channel 99, defined within the riser 41 of the camera platform assembly 95 (see FIG. 20). The rollers 66 counter any lateral loading on the shaft 98 to prevent the shaft 98 from bending and to reduce wear.

With reference to FIG. 4, and the control end 88 of the arm 8, the tilt function is actuated by the operator by means of a hand powered control lever 1. The control lever 1 acts on the control tilt cylinder 6 (housed in a tilt cylinder bracket 11). By raising or lowering the control lever 1, the control cylinder 6 is operationally activated thereby creating corresponding operative movement in the camera cylinder 39 (shown in FIG. 11), tilting the camera pan/tilt platform 44 up or down (as the case may be). As the control lever 1 is vertically displaced, it travels in an arc about its pivot point 67. The lever 1 is attached to the plunger assembly within tilt cylinder shaft 6 by a pivoting drive linkage 13, pivotally linked to fixed link 14. Drive linkage 13 has pivot points 68, 69. The control lever 1 and tilt cylinder 6, drive linkage 13 fixed link 14 are housed within a pair of mounting brackets 21. The plunger shaft of the tilt cylinder 6 travels longitudinally along the axis of the cylinder 6 as the lever 1 is vertically displaced during operational tilt selection. In a preferred embodiment, the tilt control assembly may be locked to maintain a given degree of tilt by means of a camera tilt lock knob 2 (shown in FIG. 5) which, when engaged in the locked position, secures the control lever 1 at its pivot point 67. Preferably, the jib 100 allows tilting in a range of between about 90–140 degrees.

As an option (not shown in the Figures), the levelling system may be adjustable to manually set the "level" of the camera base platform 49 at an angle offset from the horizontal plane. For instance, if a greater range of upward tilt is required, the levelling system may be set to "level" the base platform 49 at a slight, upwardly offset, tilt angle relative to the horizontal plane. The camera (on pan/tilt platform 44) may then be tilted to a greater upward degree, as the tilt angle is supplemented by the pre-selected, offset angle of the base platform 49. However, in some instances, there will be a corresponding loss of downward tilt range if the pre-selected offset angle is maintained.

In the illustrated embodiments of the invention, panning of the camera (i.e. side-to-side movement) is driven by a cable-and-pulley system, which also runs through the hollow jib arm 8. A single cable 17, guided across various pulleys and bearing guides (5, 7, 16, 36, 37, 40), runs along the length of the arm in an adjustable closed loop configuration.

Figure 10:
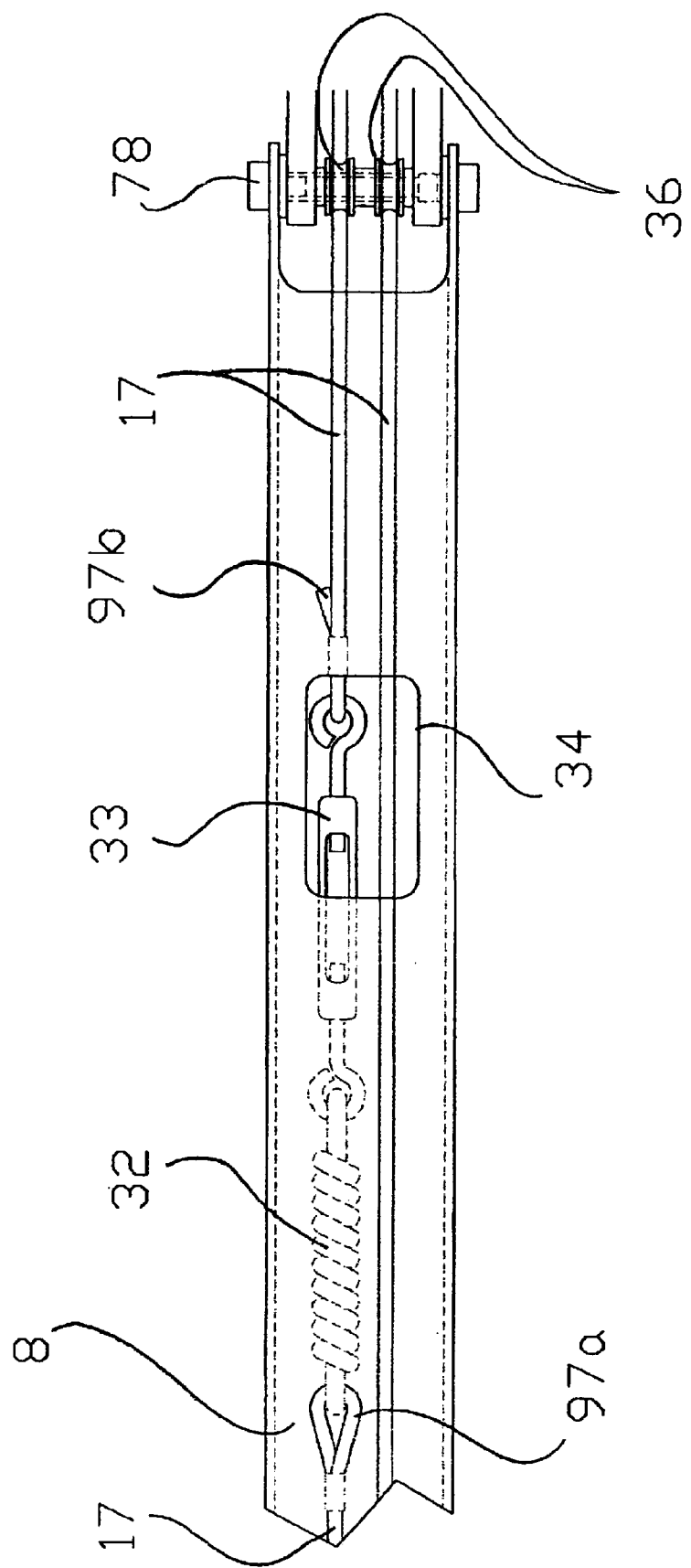
FIG. 10 is a detailed top view of a portion of the jib arm showing internal cable adjustment features of the first embodiment.

The cable 17 conveys pan control movements to the camera through frictional engagement of the cable 17 with pan control pulley 16 (connected to the control platform assembly 96 at pulley collar 20) and camera pan pulley 40 (connected to the camera platform assembly 95 at pulley collar 47). Smooth panning is provided by bearings 48, 50, 51 in the camera platform assembly 95. As shown in FIG. 10, the ends 97a, 97b of the cable 17 are joined by an expansion spring 32 and adjustable. turnbuckle 33, allowing adjustment of the cable 17 to keep it taut under tension, when in use, yet permitting sufficient expansion or "give" to prevent the cable 17 from stretching or breaking when the arm is folded. The degree of tension in the pan cable 17 can be adjusted manually by tightening or loosening the turnbuckle 33. Preferably, the turnbuckle 33 is easily accessible by the operator by means of an aperture or window 34 in the jib arm 8. The spring 32 may also provide protection against accidental over-tightening of the cable by operation of the turnbuckle when adjusting tension in the cable. Preferably, the spring 32 will be designed with suitable performance characteristics to impart sufficient frictional engagement between the cable and pan pulleys 16, 40. At the same time, the spring 32 should be designed to expand at a predetermined loading to protect the cable and other components against breakage or premature wear. As shown in FIG. 21, a pan cable tension mechanism 105 may be provided proximate to the control end 88 to support the pan cable 17 and reduce hesitation between: (a) movement of the control lever 1 and pan/boom control handle 3 by the operator, and (b) operational panning movement in the camera pan pulley 40. In operation, the operator actuates the camera pan function by swivelling the control lever 1 and pan/boom control handle 3 (shown in FIG. 5) about the vertical axis defined by the center of the pan control pulley 16. Panning movements are translated at the head end in direct relationship to the operator movements (i.e. clockwise pan motion by the operator results in clockwise pan motion by the camera). Preferably the jib 100 allows panning in a range of 300–360 degrees about a rotational axis defined by the center of the camera pan pulley 40.

In the present embodiments, the pan operation is shown as provided by a resilient, stretch resistant cable and pulley system. It will be understood that the cable may include variants such as a rope, string, or chain. In addition, it will be understood that the operation could also be provided by a hydraulic system, although with a possibility of considerable loss of pan range. Cable is currently preferred as an element that is lightweight, inexpensive, and durable under tension (i.e. difficult to stretch or snap).

A levelling system is provided to maintain the camera base platform 49 and control platform 4 at a selected angle relative to the horizontal plane while the jib arm 8 booms down or up. The operator will select the tilt angle for the camera, by using the hand operated control lever 1. The levelling system will maintain the selected tilt angle or "level" via an operative link between the control lever 1 and the camera pan/tilt platform 44. Preferably, as provided in the first embodiment (as shown in FIG. 1), the levelling system is a network of hydraulic cylinders (12, 22, 27, 35) connected for hydraulic fluid communication by tubing to form two closed loop systems. One closed loop levelling system is provided on each side of the fulcrum 75. Preferably, a total of four cylinders are provided, configured in two pairs, one pair forming a closed loop levelling component on each side of the fulcrum 75. The cylinders 12, 22, 27, 35 are preferably connected to the jib arm 8 at the base of the arm 8, using brackets having pivot points 72, 73, 74, 76, 79, 80 respectively (shown in FIGS. 3, 6, 7, 11). The hydraulic lines may be arranged to lie within or outside of the arm 8.

In order to allow ready access for service or replacement of the levelling cylinders on the jib 100, the hydraulic lines may be connected to the arm by quick-disconnect couplings (not shown).

With reference to FIG. 1, and the control end 88 of the arm, a first levelling cylinder 12 is provided. The cylinder 12 is in closed fluid communication via hydraulic tubing with a second levelling cylinder 22. The first and second levelling cylinders are positioned proximate to the control end of the jib arm. The first levelling cylinder 12 and the second levelling cylinder 22 cooperate to keep the control platform 4 level relative to the horizontal plane throughout the range of boom. A third levelling cylinder 27 is provided on the arm 8 on the opposite side of the upright member 91, a distal position relative to the control end. The third levelling cylinder 27 is in closed fluid communication via hydraulic tubing with a fourth levelling cylinder 35. The third levelling cylinder 27 and fourth levelling cylinder 35 cooperate to keep the camera base platform 49 level with respect to the horizontal plane throughout the range of boom. To illustrate, when the operator booms the camera by pivoting the jib arm 8 to move the head end 87 in an upward direction, the control end 88 of the arm 8 will be lowered. The booming action will cause the second levelling cylinder 22 to retract and the first levelling cylinder 12 to extend and move the control platform brackets 15 to level the control platform assembly 96 with respect to the horizontal plane by pivoting the control platform assembly 96 at the pivot point 70. At the same time, the third levelling cylinder 27 and fourth levelling cylinder 35 co-act to maintain the camera base platform 49 at the pre-selected tilt angle with respect to the horizontal plane.

As shown in FIGS. 14–16, a second embodiment of the jib may be provided having a variable fulcrum design. A number of fulcrum points 92a, 92b, 92c are provided. The support forks 23 pivotably support the jib arm 8 at any one of several pivot points 92a, 92b, 92c, as selected by the operator, with reference to the desired length of boom and the degree of counterweight needed (given the weight of the camera). For levelling, the hydraulic network of the first embodiment often will not be convenient, as the cylinders 22, 27 connected to the upright member 91 would need to be moved and repositioned to accommodate a change in the fulcrum position 92a, 92b, 92c. In order to accommodate the variable fulcrum placement, the levelling system is preferably provided by two telescoping levelling arms 56, 57, one arm on each side of the fulcrum. In this embodiment, the levelling arms 56, 57 are lockable telescoping arms, which allow them to be securely coupled to the jib 100 at any of the selected fulcrum placements 92a–92c. One levelling arm 56 extends between the control platform L bracket 15 and the upright member 91 at the selected fulcrum position 92a–92c. The other levelling arm 57 extends between the upright member 91 and the camera platform L bracket 38. When connected to the jib 100, the arms can both pivot at their pivot points 71a, 74a, 80a and extend in a linear direction along their longitudinal axes. The levelling arms 56, 57 may be adjusted within a range of selectable operating lengths, where desired. Each levelling arm 56 and 57 may be unlocked, to release the telescoping components of an arm, to allow adjustment of the operational length, and then the arm may be locked to securely set the levelling arm length for operation. However, it will be understood by skilled persons in the art that adjustable, locking, levelling arms as provided in the illustrated embodiment may not be required. In some instances, it may be sufficient to use levelling arms of predetermined length to provide the necessary link within the operational space provided. In the illustrated embodiment, the adjustable locking arms 56, 57 operate to keep the control platform assembly 96 level and to maintain the camera platform assembly 95 level with respect to the horizontal plane as the jib arm 8 is boomed up or down by a parallelogram linkage, as will be appreciated by one skilled in the art.

The levelling arms 56, 57 are preferably linked to the jib using quick release couplings 62, 63, 64, 65, allowing easy dismantling. The jib preferably includes travel locks 55, 58 to securely fix the camera platform assembly 95 and control platform assembly 96 relative to the jib arm when the jib arm 8 is folded (see FIG. 19) for transportation or storage.

The levelling arms 56, 57 are preferably connected to the jib 100 below the arm 8 and may have a parallel or convergent arrangement with respect to the longitudinal axis defined by the arm 8. A parallel arrangement is shown, for example, in FIG. 18. A convergent arrangement (i.e., where the levelling arms are not parallel to the jib arm) is shown, for example, in FIGS. 14–16. In the illustrated embodiment, the position of the fulcrum pivot is higher and nearer relative to the arm in the convergent arrangement, than in the parallel arrangement. In certain aspects, the convergent arrangement may offer slightly less boom range than the parallel arrangement. Persons skilled in the art will understand that the position of the fulcrum point may also be configured to be lower, and farther away from the arm, in other convergent arrangements.

In a third embodiment, the jib 100 may also include a levelling cable 60 strung in parallel arrangement with the longitudinal axis of the arm 8, as shown in FIGS. 17, 17A, or in a convergent orientation with the longitudinal axis of the arm as the cable approaches the extension bracket 61, as shown in FIG. 17B. The cable, strung taut under tension between extension brackets 59, 61 extended above the selected fulcrum 92a–92c and the camera platform L bracket 38 (as shown in FIGS. 17, 17A), acts to maintain the camera platform assembly 95 tilt angle with respect to the horizontal plane as the jib arm 8 is boomed up or down by the operative quadrilateral linkage. The cable allows the arc described by the juncture of the cable and extension bracket 61 and the arc described by the arm/bracket pivot 81 to be equivalent, as the points will be separated by a constant vertical distance. As a result, the camera base platform 38 is maintained at its desired tilt angle orientation relative to the horizontal plane as the arm 8 is boomed up or down.

As shown in FIGS. 17, 17A, and 17B a cable 60 and levelling arm 56 may be combined on the arm 8 to provide an effective levelling system.

As an option (not shown in the Figures), a cable may also be used to level the control platform assembly 96. In this arrangement, a first levelling cable would be provided between a first post extending above the control platform assembly and a second post positioned above the fulcrum point. A second levelling cable would be provided between a third post below the control platform assembly and a fourth post below the fulcrum point. In operation, either the first (upper) or the second (lower) levelling cable would be taut and the other cable would be slack, depending on the vertical force applied to the tilt control lever 1.

The cable must be under tension to offer the benefit of levelling the camera platform assembly 95. Therefore, in order to accommodate the variable position of the fulcrum 92a–92c, a set of appropriately dimensioned cables could be provided with a corresponding jib 100 kit. After selecting the fulcrum position 92a–92c, the operator could then select and string the appropriately dimensioned cable from among the set of coded cables provided within the kit. The various pre-selected lengths of cables may be colour-coded to correspond to a color matched fulcrum position (for example marked by a corresponding colored lock knob) in order to facilitate a simplified selection process for the operator. Of course other marking methods may be employed to simplify selection and installation, or replacement, of not only cable components, but also other interchangeable or modular components within the camera jib assembly.

The foregoing description illustrates only certain preferred embodiments of the invention. The invention is not limited to the foregoing examples. That is, persons skilled in the art will appreciate and understand that modifications and variations are, or will be, possible to utilize and carry out the teachings of the invention described herein. Accordingly, all suitable modifications, variations and equivalents may be resorted to, and such modifications, variations and equivalents are intended to fall within the scope of the invention as described and within the scope of the claims.

What is claimed is:

1. A camera jib for booming and swiveling a camera on a stand, the jib comprising:

an elongated arm defining a longitudinal axis and comprising:

a control end supporting a control platform;

a head end supporting a pivotable camera base platform, which supports a camera pan/tilt platform; and a leveling system for maintaining the camera base platform at an operator selected camera tilt angle, the leveling system comprising:

a first leveling linkage offset from the elongated arm and pivotably connected to, and extending a predetermined distance between, first and second posts defining a predetermined angle; the posts extending away from the elongated arm; and the first post defining a vertical axis;

a support for mounting the arm on the stand;

a hand powered first control system operable from the control end for panning the camera pan/tilt platform; and a hand powered second control system operable from the control end for tilting the camera pan/tilt platform.

2. The camera jib of claim 1, comprising a second leveling linkage offset from the elongated arm and extending between third and fourth posts extending away from the elongated arm, the second leveling linkage co-acting with the first leveling linkage to maintain the control platform at the tilt angle.

3. The camera jib of claim 1, wherein the first control system is selected from the group consisting of:

A hydraulic assembly comprising a pair of hydraulic cylinders in fluid communication along a closed fluid circuit;

A cable assembly mounted on a track defined by a plurality of bearing guides; and A control arm defining a selected length and pivotably connected to the elongated arm.

4. The camera jib of claim 3 wherein the second control system is selected from the group consisting of:

A hydraulic assembly comprising a pair of hydraulic cylinders in fluid communication along a closed fluid circuit;

A cable assembly mounted on a track defined by a plurality of bearing guides; and A control arm defining a selected length and pivotably connected to the elongated arm.

5. The camera jib of claim 4 wherein the elongated arm is foldable about a pivot point located along the longitudinal axis.

6. The camera jib of claim 5 wherein the leveling system and the first control system are operatively disconnected from the elongated arm when the elongated arm is folded.

7. The camera jib of claim 6 wherein at least one of the first and second control systems is the hydraulic assembly.

8. The camera jib of claim 6 wherein at least one of the first and second control systems is the cable assembly.

9. The camera jib of claim 5 wherein the first control system is the hydraulic assembly and the second control system is the control arm.

10. The camera jib of claim 6 wherein the second control system is the cable assembly comprising a cable being extended when the elongated arm is folded, and the cable is biased to contract when the elongated arm is unfolded.

11. The camera jib of claim 10 wherein the cable defines an adjustable operating length.

12. The camera jib of claim 11 wherein the cable defines an adjustable operating tension.

13. The camera jib of claim 1 wherein the elongated arm comprises a plurality of telescoping segments movable between a minimum length and a maximum length.

14. The camera jib of claim 13 wherein the leveling system and the first control system are operatively disconnected from the elongated arm when the elongated arm is moved from the maximum length to the minimum length.

15. The camera jib of claim 1 wherein the support for mounting the arm comprises a plurality of selectable pivot mounts along the longitudinal axis.

16. The camera jib of claim 15 wherein the elongated arm is movable between a minimum length and a maximum length.

17. The camera jib of claim 16 wherein the elongated arm is foldable about a pivot point positioned along the longitudinal axis.

18. A camera jib for booming and swiveling a camera on a stand, the jib comprising:

an elongated arm defining a longitudinal axis, movable between a maximum length and a minimum length, and comprising:

a control end supporting a control platform;

a head end supporting a pivotable camera base platform, which supports a camera pan/tilt platform; and a leveling system for maintaining the camera base platform at an operator selected camera tilt angle;

a support for mounting the arm on the stand;

a hand powered first control system operable from the control end for panning the camera pan/tilt platform; and a hand powered second control system operable from the control end for tilting the camera pan/tilt platform.

19. The camera jib claimed in claim 18 wherein the elongated arm is foldable about a pivot point positioned along the longitudinal axis.

20. The camera jib claimed in claim 19 wherein the first and second control systems are selected from the group consisting of:

a hydraulic assembly comprising a pair of hydraulic cylinders in fluid communication along a closed fluid circuit;

a cable assembly mounted on a track defined by a plurality of bearing guides; and a control arm defining a selected length and pivotably connected to the elongated arm.

21. The camera jib claimed in claim 20, wherein the leveling system and the first control system are operatively disconnected from the elongated arm when the elongated arm is folded.

22. The camera jib claimed in claim 21 wherein the second control system is the cable assembly comprising a cable being extended when the elongated arm is folded, and the cable is biased to contract when the elongated arm is unfolded.

23. The camera jib of claim 22 wherein the cable defines an adjustable operating length.

24. The camera jib of claim 23 wherein the cable defines an adjustable operating tension.

25. A camera jib for booming and swiveling a camera on a stand, the jib comprising:

an elongated arm defining a longitudinal axis, foldable at a pivot point along the longitudinal axis, and comprising:

a control end supporting a control platform;

a head end supporting a pivotable camera base platform, which supports a camera pan/tilt platform; and a leveling system for maintaining the camera base platform at an operator selected camera tilt angle;

a support for mounting the arm on the stand;

a hand powered cable assembly operable from the control end for panning the camera pan/tilt platform, the cable assembly being mounted on a track defined by a plurality of bearing guides; and a hand powered hydraulic assembly operable from the control end for tilting the camera pan/tilt platform comprising a pair of hydraulic cylinders in fluid communication along a closed fluid circuit.

26. The camera jib claimed in claim 25, wherein the leveling system and the hydraulic assembly are operatively disconnected from the elongated arm when the elongated arm is folded.

27. The camera jib claimed in claim 26 comprising a plurality of selectable pivot mounts along the longitudinal axis for securing the elongated arm to the stand.

28. The camera jib claimed in claim 26 wherein the leveling system comprises a control arm defining a selected length and pivotably connected to the elongated arm.

29. The camera jib claimed in claim 28 wherein the control arm comprises lockable telescoping arm segments.

30. The camera jib claimed in claim 25 wherein the leveling system comprises a second cable assembly offset from the elongated arm and extending a predetermined distance between first and second posts defining a predetermined angle; the posts extending away from the elongated arm; and the first post defining a vertical axis.

31. The camera jib claimed in claim 30 wherein the support for mounting the arm comprises a plurality of selectable pivot mounts along the longitudinal axis.

32. The camera jib claimed in claim 31 wherein the second cable assembly is selected from a kit consisting of a group of cable assemblies of varying length.

* * * * *